US012786831B2

(12) United States Patent
Ke

(10) Patent No.: US 12,786,831 B2
(45) Date of Patent: Nov. 3, 2026

(54) INFORMATION PROCESSING METHOD AND APPARATUS, DEVICE, AND STORAGE MEDIUM

(71) Applicant: VIVO MOBILE COMMUNICATION CO., LTD., Dongguan (CN)

(72) Inventor: Xiaowan Ke, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 555 days.

(21) Appl. No.: 18/167,983

(22) Filed: Feb. 13, 2023

(65) Prior Publication Data

US 2023/0189106 A1 Jun. 15, 2023

Related U.S. Application Data

(63) Continuation of application No. PCT/CN2021/121283, filed on Sep. 28, 2021.

(30) Foreign Application Priority Data

Sep. 30, 2020 (CN) ......................... 202011066531.2
Jan. 12, 2021 (CN) ......................... 202110038377.6

(51) Int. Cl.
*H04W 36/14* (2009.01)
*H04W 36/00* (2009.01)

(52) U.S. Cl.
CPC ........ *H04W 36/14* (2013.01); *H04W 36/0011* (2013.01)

(58) Field of Classification Search
CPC ............................ H04W 36/14; H04W 36/001
See application file for complete search history.

(56) References Cited

U.S. PATENT DOCUMENTS 9,674,758 B2 6/2017 Tsai et al.
2013/0303203 A1 11/2013 Wang et al.
(Continued)

FOREIGN PATENT DOCUMENTS

CN 102202363 A 9/2011
CN 104902528 A 9/2015
(Continued)

OTHER PUBLICATIONS

3rd Generation Partnership Project, "Technical Specification Group Services and System Aspects; Study on system enablers for devices having multiple Universal Subscriber Identity Modules (USIM)", 3GPP TR 23.761, Jan. 2020.

(Continued)

*Primary Examiner* — Justin Y Lee
(74) *Attorney, Agent, or Firm* — The Webb Law Firm

(57) ABSTRACT

Embodiments of this application provide an information processing method and apparatus, a device, and a storage medium. The information processing method includes: sending first information to a first network, where the first information includes at least one of the following: a connection establishment request, a connection resuming request, or first return information. In the embodiments of this application, the first information is sent to the first network, to process, when the terminal returns to the network, the first auxiliary information and/or indicate an operation performed by the first network based on the first auxiliary information, which can save signaling and network resources.

15 Claims, 5 Drawing Sheets

(56) References Cited

U.S. PATENT DOCUMENTS

| | | | |
|---|---|---|---|
| 2016/0198352 A1 | 7/2016 | Jarrahi Khameneh et al. | |
| 2018/0160422 A1* | 6/2018 | Pathak | H04W 76/10 |
| 2019/0222489 A1 | 7/2019 | Shan | |
| 2023/0093965 A1* | 3/2023 | Velev | H04W 68/12<br>455/458 |
| 2023/0123352 A1 | 4/2023 | Hong | |

FOREIGN PATENT DOCUMENTS

| | | | |
|---|---|---|---|
| CN | 110463249 | A | 11/2019 |
| CN | 111527761 | A | 8/2020 |
| EP | 2466976 | A1 | 6/2012 |
| EP | 2645806 | A1 | 10/2013 |
| EP | 3209054 | A1 | 8/2017 |

OTHER PUBLICATIONS

Nokia et al., "KI#3, KI#2: new solution on providing additional info of UE availability", SA WG2 Meeting #140-e, Aug. 19-Sep. 2, 2020, Online, S2-2005023.

China National Intellectual Property Administration, International Search Report issued in corresponding Application No. PCT/CN2021/121283, mailed Dec. 17, 2021.

* cited by examiner

INFORMATION PROCESSING METHOD AND APPARATUS, DEVICE, AND STORAGE MEDIUM

CROSS-REFERENCE TO RELATED APPLICATIONS

This application is a continuation of International Application No. PCT/CN2021/121283, filed on Sep. 28, 2021, which claims priority to Chinese Patent Application No. 202011066531.2, filed with the China National Intellectual Property Administration on Sep. 30, 2020 and entitled "INFORMATION PROCESSING METHOD AND APPARATUS, DEVICE, AND STORAGE MEDIUM", and Chinese Patent Application No. 202110038377.6, filed with the China National Intellectual Property Administration on Jan. 12, 2021 and entitled "INFORMATION PROCESSING METHOD AND APPARATUS, DEVICE, AND STORAGE MEDIUM", which are incorporated herein by reference in their entireties.

TECHNICAL FIELD

This application relates to the field of communication technologies, and in particular, to an information processing method and apparatus, a device, and a storage medium.

BACKGROUND

For a multi-subscriber identity module (MUSIM) terminal with only a single-issue function, because the terminal cannot simultaneously interact with a plurality of networks, when there are services and/or data related to a plurality of networks, the terminal needs to go back and forth between the plurality of different networks. How to process services and/or data in a return network is a problem that still needs to be resolved.

SUMMARY

According to a first aspect of this application, an information processing method, applied to a first communication device, is provided, which includes:

sending first information to a first network, where the first information includes at least one of the following: a connection establishment request, a connection resuming request, or first return information.

According to a second aspect of this application, an information processing method, applied to a second communication device, is provided, which includes:

receiving first information, where the first information includes at least one of the following: a connection establishment request, a connection resuming request, or first return information; and performing a third operation based on the first information and/or first auxiliary information.

According to a third aspect of this application, an information processing method is provided, which includes:

sending an invalidation time of first auxiliary information and/or an extended invalidation time of first auxiliary information to a first network.

According to a fourth aspect of this application, an information processing method is provided, which includes:

receiving second information, where the second information includes at least one of the following: a validation time of first auxiliary information or invalidation time of first auxiliary information, an extended validation time of first auxiliary information, or an extended invalidation time of first auxiliary information; and performing a fourth operation according to the second information.

According to a fifth aspect of this application, an information processing apparatus is provided, which includes:

a first sending unit, configured to send first information to a first network, where the first information includes at least one of the following: a connection establishment request, a connection resuming request, or first return information.

According to a sixth aspect of this application, an information processing apparatus is provided, which includes:

a second receiving unit, configured to receive first information, where the first information includes at least one of the following: a connection establishment request, a connection resuming request, or first return information; and a third execution unit, configured to perform a third operation based on the first information and/or first auxiliary information.

According to a seventh aspect of this application, an information processing apparatus is provided, which includes:

a second sending unit, configured to send an invalidation time of first auxiliary information and/or an extended invalidation time of first auxiliary information to a first network.

According to an eighth aspect of this application, an information processing apparatus is provided, which includes:

a fourth receiving unit, configured to receive second information, where the second information includes at least one of the following: a validation time of first auxiliary information or invalidation time of first auxiliary information, an extended validation time of first auxiliary information, or an extended invalidation time of first auxiliary information; and a fifth execution unit, configured to perform a fourth operation according to the second information.

According to a ninth aspect of this application, a terminal is provided, which includes a processor, a memory, and a program or instructions stored in the memory and executable on the processor, where the program or the instructions, when executed by the processor, implement the steps of the information processing method according to any one of the first aspect or the third aspect.

According to a tenth aspect of this application, a network-side device is provided, which includes a processor, a memory, and a program or instructions stored in the memory and executable on the processor, where the program or the instructions, when executed by the processor, implement the steps of the information processing method according to any one of the second aspect or the fourth aspect.

According to an eleventh aspect of this application, a readable storage medium, storing a program or instructions, is provided, where the program or instructions, when executed by a processor, implement the steps of the information processing method according to any one of the first aspect to the fourth aspect.

According to a twelfth aspect of this application, a chip is provided, which includes a processor and a communication interface, where the communication interface is coupled to the processor, and the processor is configured to run a program or instructions to implement the information processing method according to any one of the first aspect to the fourth aspect.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the art may still derive other drawings from these accompanying drawings.

DETAILED DESCRIPTION

Figure 1:
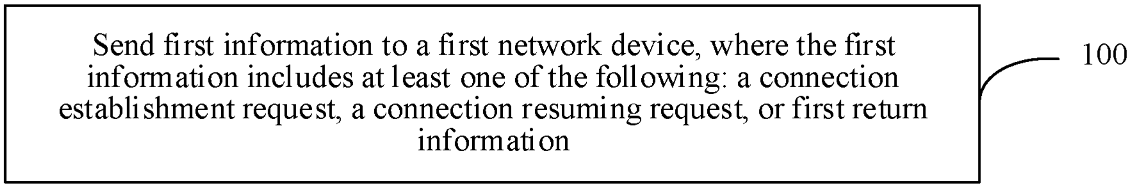
FIG. 1 is a schematic flowchart of an information processing method according to an embodiment of this application.

In addition, the terms "include" and any variant thereof in the description and claims of this application are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

In the specification and claims of this application, terms "first" and "second" are used to distinguish similar objects, but are not used to describe a specific sequence or order. It should be understood that, the terms used in this way are exchangeable in a proper case, so that the embodiments of this application can be implemented in another order other than those shown or described herein. In addition, "and/or" used in the description and claims represents at least one of connected objects. The character "/" generally indicates an "or" relationship between associated objects.

In the embodiments of this application, the term "exemplary" or "for example" is used to represent giving an example, an illustration, or a description. Any embodiment or design scheme described as an "exemplary" or "for example" in the embodiments of this application should not be explained as being more preferred or having more advantages than another embodiment or design scheme. Exactly, use of the term, such as "exemplary" or "for example", is intended to present a related concept in a specific manner.

Currently, for a multi-subscriber identity module (MUSIM) terminal with only a single-issue function, because the terminal cannot simultaneously send uplink information to a plurality of networks, the terminal needs to go back and forth between the plurality of different networks.

The following describes the embodiments of this application with reference to the accompanying drawings. The information processing method and apparatus and communication device provided in the embodiments of this application are not limited to the Long Term Evolution (LTE)/LTE-advanced (LTE-A) system, and may further be applied to other wireless communication systems such as Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA), and other systems. The terms "system" and "network" may be used interchangeably in the embodiments of this application. The technology described can be applied to the systems and radio technologies mentioned above, and can also be applied to other systems and radio technologies. However, in the following descriptions, for the purpose of exemplification, the New Radio (NR) system is described, and NR terms are used in most of the following descriptions. However, the technologies may also be applied to applications in addition to NR system applications, for example, the $6^{th}$ Generation (6G) communication system.

For better understanding of the embodiments of this application, the following technical points are first described below:

Multi-card terminal (also referred to as multi-card UE) is a device with two or more subscriber identity module (SIM) cards. The SIM card is an electronic SIM card or a physical SIM card. From the perspective of the network, a same terminal device and different SIM cards constitute different UEs. In addition, a multi-card terminal can also be referred to as a multi-universal subscriber identity module (MUSIM) terminal.

Optionally, the SIM cards in the multi-card terminal may belong to a same operator or different operators. The wireless communication networks to which different SIM cards are connected may be the same or different.

Optionally, the SIM card may include one of the following: an SIM card, a universal user identity module (USIM) card, or an embedded SIM (eSIM) card. The SIM card may also be named by another name, for example, is referred to as "card" directly, which is not limited in this application.

The following several scenarios are considered:

Scenario 1: A terminal receives paging from a card A, and determines that there is an important service (for example, voice). Then, the terminal leaves a first network (for example, a network corresponding to a card B), sends first auxiliary information to the first network to block paging or suspend data or discard data, and then, goes to a second network (for example, a network corresponding to the card A). After a key service of the card A ends, the terminal may choose to still stay in the second network. In this case, it no longer proper to continue blocking paging or suspending or discarding data in the first network because the terminal expects to learn of information about a service and/or data in the first network.

Scenario 2: In a process in which a terminal leaves a first network, the terminal or a user updates or deletes first auxiliary information. In this case, how to perform synchronization to the first network is not clear.

Scenario 3: In a process in which a terminal is connected to a second network, the terminal needs to leave the second network for a short period and return to a first network to complete some important uplink signaling (for example, a location area update), and continues to return to the second network after the uplink signaling is completed. In this case, the UE does not really want to return to the first network.

For example, during a location area update process, resuming of a PDU (Protocol Data Unit, protocol data unit) session may cause a long delay in the location area update process. When the UE does not really want to return to the first network, first auxiliary information is still valid, downlink data is continuously blocked, and a data channel (such as a PDU session) may not be resumed.

In another example, an IMS (IP Multimedia Subsystem, IP multimedia subsystem) heartbeat report needs to be transmitted by resuming a resource of a PDU session of an IMS. In this case, other PDU sessions can conveniently be resumed together in parallel.

In another example, for a busy indication, that is, a paging rejection, it is not needed to resume all PDU sessions.

In another example, for periodical IMS reports, the terminal may choose to selectively activate individual PDU sessions.

Scenario 3.1: After the terminal really returns to the first network, the first network may have cached downlink data or signaling, particularly, of a data type previously blocked in the first auxiliary information. The downlink should be considered in determining whether to activate a user plane connection.

Sub-scenario 3.1: When a service or a PDU session suspended in the first auxiliary information is 1, but when the terminal returns to the first network, it happens that data of a service or a PDU session that is 2 is generated, the terminal needs to learn of information about 2, to decide whether to leave the first network or really return to the first network to receive data of 2. When the terminal determines to return to the first network, a state of the terminal on a card A may be set to a non-connected state.

Therefore, there are also the following problems to be resolved:

Problem 1: How to deal with the update and invalidation of the first auxiliary information in a process in which the terminal leaves the network or when the terminal returns to the network for a short period.

Problem 2: How does the network learn, when the terminal returns to the network, whether the terminal returns for a short period or really returns and whether an UP connection needs to be resumed.

In an optional embodiment of this application, type information of a service and/or data can be represented as a paging reason in a paging message or notification type information in a notification message. The type information of the service and/or the data may be type information of a service and/or data on a network side. The type information of the data includes type information of a service to which the data belongs and type information (such as control plane signaling) of the data itself.

In an optional embodiment of this application, the type information of the data includes, but is not limited to, at least one of the following: control plane signaling (such as NAS signaling), user plane data, and a type of a service to which the data belongs. The control plane signaling may include, but is not limited to, a CN location update.

In this application, an optional embodiment, the type information of the service and/or the data includes, but is not limited to, at least one of the following: an IMS, an IMS voice service, a location service (LCS), an SMS message, control plane signaling (such as a CN location update), IMS signaling (such as periodical IMS reports), paging reception, a RAN notification, a rejection response to paging (such as a busy indication), IPv6 broadcast, or the like. Generally, the IMS has a dedicated data channel (such as a PDU session). When there is data in the data channel for the IMS, the type information corresponding to the service and/or the data can be derived. The IMS includes at least one of the following: IMS voice, an IMS SMS message, IMS signaling, or the like.

In an optional embodiment of this application, an objective of returning to the first network for a short period includes, but is not limited to, uplink data and/or an uplink service. The data includes control plane and/or user plane data, and is, for example, uplink data, for example, a location update. For example, when the terminal is moved out of a range of a location area, the location needs to be updated to the first network. It is not difficult to understand that when the location update process ends, the downlink data and/or the downlink service of the first network can still be suspended on the first network. In this way, the terminal can leave the first network as soon as possible and return to the second network to resume the service of the second network.

In an optional embodiment of this application, the paging includes at least one of the following: a notification paging message or a notification message.

In an optional embodiment of this application, the time may include at least one of the following: a duration or a time point. For example, the planned leave time may include a planned leave time point. The return time may include a return time duration. In an optional embodiment of this application, the return time is a time of returning to the first network, and the planned leave time is a planned time of leaving the first network.

(1) In an implementation, the time of returning to the first network includes a duration of returning to the first network. (2) In an implementation, the planned time of leaving the first network includes a planned time point of leaving the first network.

In an optional embodiment of this application, a return time (such as a duration) or a planned leave time (such as a duration) sent by the terminal to the first network may be less than or equal to a time (such as a duration) negotiated by the terminal with the second network for keeping a connected state of the terminal after the terminal leaves. Alternatively, a return time (such as a time point) or a planned leave time (such as a time point) sent by the terminal to the first network may be earlier than or equal to a time (such as a time point) negotiated by the terminal with the second network for keeping a connected state of the terminal after the terminal leaves.

In an optional embodiment of this application, the short-period leave includes a leaving manner of keeping a connected state and/or suspending data transmission.

In an optional embodiment of this application, the long-period leave includes a leaving manner for entering a non-connected state.

In an optional embodiment of this application, the short-period return includes at least one of the following: connection establishment and/or resuming with a limited specified duration, connection establishment and/or resuming blocking a downlink service and/or downlink data, a connection establishment request and/or resuming request including first return information, a connection establishment request and/or resuming request including first indication information, or a connection establishment request and/or resuming request including a return time or a planned leave time.

In an optional embodiment of this application, the long-period return includes at least one of the following: a return mode of a non-short-period return, connection establishment and/or resuming of a non-short-period return, connection establishment and/or resuming without a limited duration, connection establishment and/or resuming without blocking a downlink service and/or downlink data, connection establishment and/or resuming for an operation performed not based on first return information, connection establishment and/or resuming for an operation performed not based on first indication information, connection establishment and/or resuming for an operation performed not based on a return time or a planned leave time, a connection establishment request and/or resuming request not including first return information, a connection establishment request and/or resuming request not including first indication information, or a connection establishment request and/or resuming request not including a return time or a planned leave time.

The connection is an abbreviation for the connection between the terminal and the network.

In an optional embodiment of this application, suspending the connection between the terminal and the first network includes at least one of the following: setting the connection between the terminal and the first network to an inactive state, and saving a context of the terminal.

In an optional embodiment of this application, a non-connected state may include at least one of the following: an idle state and an inactive state.

(1) In an optional embodiment of this application, the inactive state includes an RRC inactive state. In an optional embodiment of this application, the idle state includes at least one of the following: an RRC idle state or a CM idle state.

In an optional embodiment of this application, the connection between the terminal and the network includes at least one of the following: an RRC connection or a NAS layer connection.

(1) In an optional embodiment of this application, the connection between the terminal and the first network includes at least one of the following: an RRC connection between the terminal and the first network and a connection management (CM) connection between the terminal and the first network.

(2) In an optional embodiment of this application, the connection between the terminal and the second network includes at least one of the following: an RRC connection between the terminal and the second network and a connection management (CM) connection between the terminal and the second network.

In an optional embodiment of this application, the data channel includes at least one of the following: a PDU session, a quality of service (QoS) flow, an evolved packet system (EPS) bearer, a PDP context, a DRB, an SRB, or an Internet security protocol (IPsec) association.

In an optional embodiment of this application, the first return information may be used for instructing the first network to perform an operation on the first auxiliary information, the connection between the terminal and the first network, a data channel related to the terminal, data related to the terminal, a service related to the terminal, and/or paging related to the terminal based on the first return information; The operation includes a blocking operation and/or an unblocking operation.

In an optional embodiment of this application, the first auxiliary information includes information that is provided by the terminal to the network and that is about an operation (the operation includes a blocking operation) performed on the connection between the terminal and the first network, the data channel related to the terminal, the data related to the terminal, the service related to the terminal, and/or the paging related to the terminal. In an implementation, when the terminal leaves the first network, the terminal provides the first auxiliary information to the first network. The first auxiliary information may also be referred to as leave auxiliary information or multi-card terminal auxiliary information.

In an optional embodiment of this application, the first auxiliary information includes at least one of the following: blocking all downlink services and/or data, information about a blocked data channel, information about a blocked service, a blocked paging reason, information about a data channel that is not blocked, information about a service that is not blocked, or a paging reason that is not blocked.

In an optional embodiment of this application, the blocking includes at least one of the following: caching, discarding, stopping, rejecting, not sending, not initiating, or suspending. The blocking first data includes at least one of the following: caching the first data, discarding the first data, stopping the first data, or not sending first data. The blocking a first service includes at least one of the following: caching the first service, discarding the first service, stopping the first service, rejecting the first service, not initiating the first service, or suspending the first service. The blocking first paging includes at least one of the following: caching the first paging, discarding the first paging, stopping the first paging, not sending the first paging, or suspending the first paging.

In an optional embodiment of this application, the invalidation time of the first auxiliary information includes: a time point at which the first auxiliary information becomes invalid. The validation time of the first auxiliary information includes one of the following: a validation expiration time point of the first auxiliary information or a validation duration of first auxiliary information.

In an optional embodiment of the present disclosure, the connection establishment request includes at least one of the following: an RRC connection establishment request or a NAS connection establishment request (for example, a registration request or a service request).

In an optional embodiment of the present disclosure, the connection resuming request includes at least one of the following: an RRC connection resuming request or a NAS connection resuming request (for example/such as, a registration request or a service request).

In an optional embodiment of this application, the information used for blocking a downlink service and/or downlink data includes information used for blocking all downlink services and/or all downlink data. According to the information, a second communication device can keep all data channels suspended. In an implementation, the information about all downlink services and/or all downlink data excludes response services and/or data for a service and/or data requested by the terminal.

In an optional embodiment of this application, the downlink service may be a service related to the terminal initiated by the network. The downlink data may data to be sent by the network to the terminal.

In an optional embodiment of this application, resuming and activation can mean the same thing, and both can represent at least one of the following: allocating a resource to a data channel, resuming a connection of a data channel, or activating a data channel.

In an optional embodiment of this application, establishment and activation can mean the same thing. Both can represent at least one of the following: establishing a connection, activating a connection, activating a connection, establishing a connection, or the like.

In an optional embodiment of this application, the network may send paging via a paging message or via a notification (Notification) message.

The following describes the embodiments of this application with reference to the accompanying drawings. The connection control method and apparatus and communication device provided in the embodiments of this application can be applied to the following network system. The network system includes: a terminal, a radio access network (RAN) network element, and a core network (CN) network element.

In an embodiment of this application, the communication device may include at least one of the following: a communication network element device or a terminal.

In an embodiment of this application, the communication network element may include at least one of the following: a core network network element or a radio access network network element.

In the embodiments of this application, the core network network element may include, but is not limited to, at least one of the following: a core network device, a core network node, a core network function, a core network network element, a mobility management entity (MME), an access mobility management function (AMF), a session management function (SMF), a user plane function (UPF), a serving gateway (SGW), a PDN gateway, a policy control function (PCF), a policy and charging rule functions unit (PCRF), a serving GPRS support node (SGSN), a gateway GPRS support node (GGSN), unified data management (UDM), a unified data repository (UDR), a home subscriber server (HSS), an application function (AF), or centralized network configuration (CNC).

In the embodiments of this application, the radio access network network element may include, but is not limited to, at least one of following: a radio access network device, a radio access network node, a radio access network function, a radio access network unit, a 3rd Generation Partnership Project (3GPP) radio access network, a non-3GPP radio access network, a centralized unit (CU), a distributed unit (DU), a base station, an evolved NodeB (eNB), a 5G NodeB (gNB), a radio network controller (RNC), a base station (NodeB), a non-3GPP interworking function (N3IWF), an access control (AC) node, an access point (AP) device or a wireless local area network (WLAN) node, or an N3IWF.

The base station may be a base station (BTS, Base Transceiver Station) in a Global System for Mobile communications (GSM) or Code Division Multiple Access (CDMA), or may be a NodeB (NodeB) in Wideband Code Division Multiple Access (WCDMA), or may be an evolved NodeB (eNB or e-NodeB, evolved Node B) and a 5G NodeB (gNB) in LTE, which is not limited in the embodiments of this application.

In the embodiments of this application, the terminal (including UE) may include a relay supporting a terminal function and/or a terminal supporting a relay function. The terminal may also be referred to as a terminal device or a user terminal (User Equipment, UE). The terminal may be a terminal-side device such as a mobile phone, a tablet computer, a laptop computer, a personal digital assistant (PDA), a mobile Internet device (MID), a wearable device, or an in-vehicle device. It should be noted that a specific type of the terminal is not limited in the embodiments of this application.

In an optional embodiment of this application, the obtaining may be understood as obtaining from configurations, receiving, receiving after requesting, obtaining through self-learning, deriving according to unreceived information, or obtaining after performing processing according to received information, which may be determined according to actual needs, and is not limited in the embodiments of this application.

In an optional embodiment of this application, the sending may include broadcasting, broadcasting in a system message, returning in response to a request, sending of dedicated signaling, and the like.

The following clearly and completely describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

Referring to FIG. 1, the embodiments of this application provide an information processing method. The method is executed by a first communication device. The first communication device may be a terminal. As shown in FIG. 1, this method includes following step:

Step 100: Send first information to a first network device.

Optionally, the first network may be a network to which the terminal has provided first auxiliary information or a network to which the terminal has been connected to.

The first auxiliary information includes information that is provided by the terminal to the network and that is about an operation performed on a connection between the terminal and the first network, a data channel related to the terminal, data related to the terminal, a service related to the terminal, and/or paging related to the terminal. The operation includes a blocking operation.

The first information includes, but is not limited to, at least one of the following: a connection establishment request, a connection resuming request, or first return information.

In an implementation, the terminal sends a connection establishment request and/or a connection resuming request to the first network. For example, after completing an important service in a second network, if the terminal wants to continue staying in the second network while receiving a notification (for example, a paging reason in paging) of type information of a service and/or data in the first network, the terminal may leave the second network, return to the first network, send a connection establishment request and/or a connection resuming request to the first network, and establish and/or resume a connection with the first network. Once the connection is established or resumed, a communication device (such as an AIVIF) of the first network may set the first auxiliary information to be invalid.

In an implementation, the terminal sends first return information to the first network.

The first return information may be used for instructing the first network to perform an operation on the first auxiliary information, the connection between the terminal and the first network, a data channel related to the terminal, data related to the terminal, a service related to the terminal, and/or paging related to the terminal based on the first return information. The operation includes a blocking operation.

It should be noted that in an implementation, when the terminal leaves the first network, the terminal provides the first auxiliary information to the first network. The first auxiliary information may also be referred to as leave auxiliary information or multi-card terminal auxiliary information.

The operation in the "information about an operation performed on a connection between the terminal and the first network, a data channel related to the terminal, data related to the terminal, a service related to the terminal, and/or paging related to the terminal" includes a blocking (for example, block) operation.

In an implementation, the blocking includes at least one of the following: caching, discarding, stopping, rejecting, not sending, not initiating, or suspending.

In the information processing method provided in this embodiment of this application, the first information is sent to the first network, to process, when the terminal returns to the network, the first auxiliary information and/or indicate an operation performed by the first network based on the first auxiliary information, which can save signaling and network resources.

Optionally, the first return information is sent in a case that a first condition is satisfied.

The first condition includes at least one of the following:

a terminal leaves a second network or a terminal leaves a second network for a short period;

a terminal returns to the first network or a terminal returns to the first network for a short period;

a terminal has left the first network; or a terminal has provided first auxiliary information to the first network.

Alternatively, in an implementation, the first return information is sent in a case that the terminal leaves the second network or the terminal leaves the second network for a short period.

In an implementation, the first return information is sent in a case that the terminal returns to the first network or the terminal returns to the first network for a short period.

In an implementation, the first return information is sent in a case that the terminal has left the first network.

That the terminal has left the first network includes: after the terminal leaves the first network, the terminal returns to the first network.

In an implementation, the first return information is sent in a case that the terminal has provided the first auxiliary information to the first network.

That the terminal has provided the first auxiliary information to the first network includes: after providing the first auxiliary information to the first network, the terminal updates or deletes the first auxiliary information.

In the information processing method provided in this embodiment of this application, the first information is sent to the first network in a case that a first condition is satisfied, to process, when the terminal returns to the network, the first auxiliary information and/or indicate an operation performed by the first network based on the first auxiliary information, which can save signaling and network resources.

Optionally, based on the content of the foregoing embodiments, the first return information includes at least one of the following:

first indication information used for indicating that the first auxiliary information is invalid;

second indication information used for indicating that the first auxiliary information is valid;

a return time or a planned leave time;

third indication information used for indicating a short-period return or a planned leave;

fourth indication information used for indicating a long-period return;

information used for blocking a downlink service and/or downlink data;

request information for a data channel; or updated first auxiliary information.

Alternatively, in an implementation, the first return information sent by the terminal to the first network may be first indication information used for indicating that the first auxiliary information is invalid, to explicitly indicate to the first network that the first auxiliary information is invalid.

In an implementation, the first return information sent by the terminal to the first network may be second indication information used for indicating that the first auxiliary information is valid, to explicitly indicate to the first network that the first auxiliary information is valid.

In an implementation, the second indication information includes at least one of the following: an indication for refusing to resume and/or establish a connection between the terminal and a network; an indication for refusing to resume and/or activate signaling and/or data transmission between the terminal and a network; an indication for refusing to accept paging; or a busy indication.

Optionally, the indication for refusing to accept paging indicates that the terminal receives paging sent by the network, but refuses to accept the paging. The refusing to accept paging may indicate refusing to resume and/or establish a connection between the terminal and a network or refusing to resume and/or activate signaling and/or data transmission between the terminal and a network. In this case, the terminal may send, to the network, an indication for refusing to accept paging. Therefore, the terminal may request to resume or establish a connection with the network only for sending an indication for refusing to accept paging rather than really wanting to resume or establish the connection between the terminal and the network, and/or rather than really resuming and/or activating signaling and/or data transmission. In this case, the first auxiliary information provided by the terminal to the network may continue being valid. It is not difficult to understand that the indication for refusing to accept paging may be used for indicating that the first auxiliary information is valid.

Optionally, the indication for refusing to resume and/or establish a connection between the terminal and a network indicates that the terminal receives paging sent by the network, but refuses to resume and/or establish a connection between the terminal and the network. In this case, the first auxiliary information provided by the terminal to the network may continue being valid. It is not difficult to understand that the indication for refusing to resume and/or establish a connection between the terminal and a network may be used for indicating that the first auxiliary information is valid.

Optionally, the indication for refusing to resume and/or activate signaling and/or data transmission between the terminal and a network indicates that the terminal receives paging sent by the network, but refuses to resume and/or activate signaling and/or data transmission between the terminal and the network. In this case, the first auxiliary information provided by the terminal to the network may continue being valid. It is not difficult to understand that the indication for refusing to resume and/or activate signaling and/or data transmission between the terminal and a network may be used for indicating that the first auxiliary information is valid.

In an implementation, the first return information sent by the terminal to the first network may be a time of returning to the first network or a planned time of leaving the first network.

In this embodiment of this application, the time includes, but is not limited to, one of following: a duration or a time point.

In an implementation, the time of returning to the first network includes a duration of returning to the first network.

In an implementation, the planned time of leaving the first network includes a planned time point of leaving the first network.

In an implementation, the first return information sent by the terminal to the first network may be third indication information used for indicating a short-period return or a planned leave, so as to clearly indicate to the first network that the terminal returns for a short period or plans to leave.

In an implementation, the first return information sent by the terminal to the first network may be fourth indication information used for indicating a long-period return.

In an implementation, the first return information sent by the terminal to the first network may be information used for blocking a downlink service and/or downlink data.

In an implementation, the first return information sent by the terminal to the first network may be request information for a data channel.

The request information for the data channel includes at least one of the following:

indication information for requesting for skipping resuming the data channel; indication information for requesting for resuming the data channel connection, information about the data channel of which activation is requested, or information about the data channel of which inactivation is requested.

In an implementation, the terminal may send, to the first network, indication information for requesting for skipping resuming the data channel.

The indication information for requesting for skipping resuming the data channel includes indication information requesting for skipping resuming all data channels. It is not difficult to understand that when the terminal returns for a short period, the network may skip resuming all data channels, and instead, sends type information of a service and/or data to the terminal for confirmation, and then, resumes a requested data channel according to information about a data channel that the terminal requests to activate. Because activation of a data channel may cause a long delay, through the foregoing operations, the terminal can quickly achieve an objective of a short-period return and then quickly leave when determining that types of the service and/or the data are not important.

The information about the data channel of which activation is requested includes at least one of the following: identification information of the data channel of which activation is requested, or setting a state of the data channel of which activation is requested to be active (for example, Active).

The information about the data channel of which inactivation is requested includes at least one of the following: identification information of the data channel of which inactivation is requested, or setting a state of the data channel of which inactivation is requested to be inactive (for example, inactive).

In an implementation, the first return information sent by the terminal to the first network may be updated first auxiliary information.

The updated first auxiliary information includes updated information about an operation performed on the connection between the terminal and the first network, the data channel related to the terminal, the data related to the terminal, the service related to the terminal, and/or the paging related to the terminal. Optionally, the operation includes a blocking operation.

In the information processing method provided in this embodiment of this application, first return information is sent to the network in a case that a first condition is satisfied, and the first return information may be indication information used for indicating that first auxiliary information is invalid or valid, may be indication information used for indicating a short-period return or a long-period return, or may be request information for a data channel, a return time, or updated first auxiliary information, so that the first auxiliary information can be processed flexibly and/or an operation performed by the first network based on the first auxiliary information is indicated.

Optionally, in the information processing method provided in another embodiment of this application, after step 100 in which the terminal sends the first information to the first network, the method further includes the following steps:

Step 101: Receive type information of a service and/or data sent by the first network.

The terminal receives type information of a service and/or data sent by the first network.

Step 102: Perform at least one of the following according to the type information of the service and/or the data:

re-determining a return type of a return to the first network, where the return type includes a long-period return or a short-period return;

re-determining to return to or leave from the first network;

re-determining whether the first auxiliary information is valid;

re-determining a leave type of a leave from the second network, where the leave type includes a long-period leave or a short-period leave;

determining whether to extend or delay a return time or a planned leave time;

determining whether to request the first network to activate a data channel corresponding to the service and/or the data;

determining whether to request the first network to block the service and/or the data;

determining whether to request the first network to suspend a data channel corresponding to the service and/or the data;

determining whether to update the first auxiliary information;

determining whether to release or suspend a connection with the second network locally;

determining whether to set a state of a connection with the second network to a non-connected state;

sending return confirmation information to the first network; or sending leave confirmation information to the second network.

Optionally, the service and/or the data in the performed operation may include, but are not limited to, some or all of services and/or the data in the type information of the service and/or the data.

Alternatively, the terminal reconfirms (double check), according to the type information of the service and/or the data sent by the first network, related content of the first return information, and reconfirms a short-period return or a long-period return to the first network.

In an implementation, the terminal determines whether to return to or leave the first network. The return may include a long-period return. The leave includes one of the following: leaving immediately or requesting to leave.

In an implementation, in a case that the terminal reconfirms a long-period leave, it can be determined that the first auxiliary information is invalid.

In an implementation, in a case that the terminal reconfirms a short-period leave, it can be determined that the first auxiliary information is valid.

In an implementation, the terminal updates the first auxiliary information according to the type information of the service and/or the data, to, for example, block more services and/or data or unblock some services and/or data.

In an implementation, the terminal may request to activate a corresponding data channel connection according to the type information of the service and/or the data, to receive data.

In an implementation, the terminal may extend or delay, according to the type information of the service and/or the data, the time of returning to the first network or the planned time of leaving the first network.

In an implementation, the terminal may request, according to the type information of the service and/or the data, to block the service and/or the data.

In an implementation, the terminal may request, according to the type information of the service and/or the data, to suspend the data channel corresponding to the service and/or the data.

In an implementation, the terminal may release or suspend the connection with the second network locally according to the type information to the service and/or the data.

In an implementation, the terminal may set, according to the type information to the service and/or the data, setting the state of the connection with the second network to the non-connected state.

In an implementation, the terminal may send return confirmation information to the first network according to the type information of the service and/or the data.

In an implementation, the return confirmation information is a reconfirmation based on the first return information. The return confirmation information may be the same as or different from the first return information. It is not difficult to understand that when the return confirmation information is different from the first return information, it indicates that the terminal and/or the user have made another decision. For example, in an implementation, the terminal and/or the user determine the first return information only according to an uplink service and/or uplink data. Subsequently, the terminal and/or the user may determine the return confirmation information according to the uplink service and/or the uplink data and a downlink service and/or downlink data.

For example, the first return information includes second indication information used for indicating that the first auxiliary information is valid. After the reconfirmation, the return confirmation information may include confirmation information of the first auxiliary information, and the confirmation information of the first auxiliary information may include eighth indication information used for indicating that the first auxiliary information is invalid.

For example, the first return information includes third indication information used for indicating a short-period return or a planned leave. After the reconfirmation, the return confirmation information may include return confirmation type information, and the return confirmation type information may include sixth indication information used for indicating a long-period return.

Optionally, the return confirmation information includes at least one of the following: return confirmation type information, the return time or the planned leave time, confirmation information of first auxiliary information, request information for a data channel, or updated first auxiliary information.

The return confirmation type information includes one of the following: fifth indication information used for indicating a short-period return or used for indicating a leave or sixth indication information used for indicating a long-period return or used for indicating a return.

The confirmation information of the first auxiliary information includes one of following: seventh indication information used for indicating that the first auxiliary information is valid or eighth indication information used for indicating that the first auxiliary information is invalid.

It should be noted that when a connection is established and/or resumed, it is acceptable to not resume all data channels first, and subsequently, importance of some services and/or data is determined according to the received type information of the service and/or the data, and then, activation of a corresponding data channel is requested.

In an optional embodiment, the seventh indication information used for indicating that the first auxiliary information is valid includes at least one of the following: a confirmation of an indication for refusing to accept paging (for example, a confirmation of a busy indication); a confirmation of refusing to resume and/or activate signaling and/or data transmission between the terminal and the network; or a confirmation of an indication for skipping resuming and/or establishing a connection between the terminal and the network. Optionally, after sending second indication information, the terminal receives type information of a service and/or data sent by the first network, and the terminal can reconfirm the seventh indication information according to the type information of the service and/or the data, and send the seventh indication information. For example, the terminal still refuses to accept paging, still refuses to resume and/or establish a connection between the terminal and the network, and/or still refuses to resume and/or activate signaling and/or data transmission between the terminal and the network. In this case, the first auxiliary information provided by the terminal to the network may continue being valid. It is not difficult to understand that a confirmation of an indication for refusing to accept paging (for example, a confirmation of a busy indication); a confirmation of refusing to resume and/or activate signaling and/or data transmission between the terminal and the network; and/or a confirmation of an indication for skipping resuming and/or establishing a connection between the terminal and the network can be used for indicating that the first auxiliary information is valid.

In an implementation, the terminal may send leave confirmation information to the second network according to the type information of the service and/or the data.

The leave confirmation information includes one of the following: first leave indication information used for indicating a short-period leave or second leave indication information used for indicating a long-period leave.

In an implementation, after the sending first information to a first network, or after the sending return confirmation information to the first network, the method further includes:

receiving second confirmation information. The second confirmation information includes: indication information for confirming that the first auxiliary information is invalid or indication information for confirming that the first auxiliary information is valid.

In an implementation, the second confirmation information may be used for the first network to determine whether the first auxiliary information continues being valid or is invalid. For example, when the terminal sends second indication information or a seventh indication, the first network may determine second confirmation information and send the second confirmation information to the terminal. In an implementation, even if the terminal sends the second indication information, for example, based on a policy or another factor, the first network may also set the first auxiliary information to be invalid.

In the information processing method provided in this embodiment of this application, after first information is sent to the first network, type information of a service and/or data sent by the first network are received, and a short-period return or a long-period return to the first network is reconfirmed according to the type information of the service and/or the data, so that the network learns whether the terminal returns for a short period or really returns, and then perform related operations, which can reduce signaling interaction and enable the terminal to quickly achieve an objective of a short-period return and leave quickly when the terminal determines that the types of the service and/or the data are not important.

Further, based on the content of the foregoing embodiments, after re-determining related content of the first return information according to the type information of the service and/or the data, the terminal performs a first operation, including:

performing the first operation in a case that a second condition is satisfied, where the first operation includes at least one of the following:

sending at least one of the following to the first network: the sixth indication information used for indicating a long-period return or used for indicating a return, the eighth indication information used for indicating that the first auxiliary information is invalid, or the request information for the data channel;

sending the second leave indication information to the second network;

releasing or suspending the connection between the terminal and the second network locally; or setting a state of a connection between the terminal and the second network to a non-connected state.

The request information for the data channel includes at least one of the following: indication information for requesting for skipping resuming the data channel connection; indication information for requesting for resuming the data channel connection, information about the data channel of which inactivation is requested, or information about the data channel of which activation is requested.

The second condition includes at least one of the following:

it is re-determined that the return type of the return to the first network is the long-period return;

it is re-determined that the leave type of the leave from the second network is the long-period leave; or it is re-determined that the first auxiliary information is invalid.

In an implementation, in a case that the second condition is satisfied, the request information for the data channel may include at least one of the following: indication information for requesting for resuming the data channel connection, information about the data channel of which inactivation is requested, or information about the data channel of which activation is requested. It is not difficult to understand that in this case, the terminal has returned, and a corresponding data channel can be activated as needed.

Additionally/Alternatively, a second operation is performed in a case that a third condition is satisfied, where the second operation includes at least one of the following:

sending at least one of the following to the first network: the fifth indication information used for indicating a short-period return or used for indicating a leave, the seventh indication information used for indicating that the first auxiliary information is valid, the return time or the planned leave time, the request information for the data channel, or the updated first auxiliary information;

sending the first leave indication information to the second network; or performing at least one of the following when the fifth indication information is used for indicating that the leave or return time arrives, the planned leave time arrives, and/or an objective of the short-period return to the first network is achieved: sending a leave request and/or the updated first auxiliary information to the first network; releasing or suspending the connection with the first network locally; setting the state of the connection with the first network to the non-connected state; sending, to the second network, indication information indicating a return; or establishing or resuming the connection with the second network locally.

In an implementation, an objective of returning to the first network for a short period includes, but is not limited to, uplink data and/or an uplink service. The data includes control plane data and/or user plane data.

For example, the objective of the short-period return to the first network is uplink data such as a location update, or when the terminal is moved out of a range of a location area, the location needs to be updated to the first network. It is not difficult to understand that when the location update process ends, the downlink data and/or the downlink service of the first network can still be suspended on the first network. In this way, the terminal can leave the first network as soon as possible and return to the second network to resume the service of the second network.

The third condition includes at least one of the following:

it is re-determined that the return type of the return to the first network is the short-period return;

it is re-determined that the leave type of the leave from the second network is the short-period leave; or it is re-determined that the first auxiliary information is valid.

In an implementation, in a case that the third condition is satisfied, the request information for the data channel may include at least one of the following: indication information for requesting for resuming the data channel connection, information about the data channel of which inactivation is requested, or information about the data channel of which activation is requested. It is not difficult to understand that, in this case, the terminal returns for a short period, a return time may be not long enough for activating the data channel. Alternatively, the return time may be enough for activating only some data channels.

In the information processing method provided in this embodiment of this application, operations performed by the terminal in a case that different conditions are satisfied are described, to enable the network to learn whether the terminal returns for a short period or really returns and then perform related operations, which can effectively reduce signaling interaction.

Optionally, in the information processing method provided in another embodiment of this application, it is further included that: in a case that the first return information is empty, or the first information does not include the first return information, it indicates a long-period return.

It is not difficult to understand that in an implementation, the return corresponds to a default operation of connection resuming or connection establishment, and only the short-period return requires the terminal to provide additional information during connection resuming or connection establishment. Therefore, the terminal sends first information to the first network, and if first return information included in the first information is empty, or the first information does not include first return information, first indication information, a return time, or a planned leave time, it may indicate that the terminal returns for a long period.

Optionally, in the information processing method provided in another embodiment of this application, after the step of sending the first return information to the first network, the method further includes:

performing at least one of the following when fifth indication information is used for indicating that a leave or return time arrives, a planned leave time arrives, and/or an objective of a short-period return to the first network is achieved:

sending a leave request and/or updated first auxiliary information to the first network;

releasing or suspending a connection between a terminal and the first network locally;

setting a state of a connection between a terminal and the first network to a non-connected state;

sending, to a second network, indication information indicating a return; or establishing or resuming a connection between a terminal and a second network locally.

An objective of returning to the first network for a short period includes, but is not limited to, uplink data and/or an uplink service. The data includes control plane and/or user plane data.

The return time is a return time in the first return information or return confirmation information.

The leave time is a planned leave time in the first return information or the return confirmation information.

The information processing method provided in this embodiment of this application provides an implementation method for the terminal to leave the first network and go to the second network when the short-period return time arrives or the objective of the short-period return is achieved.

Figure 2:
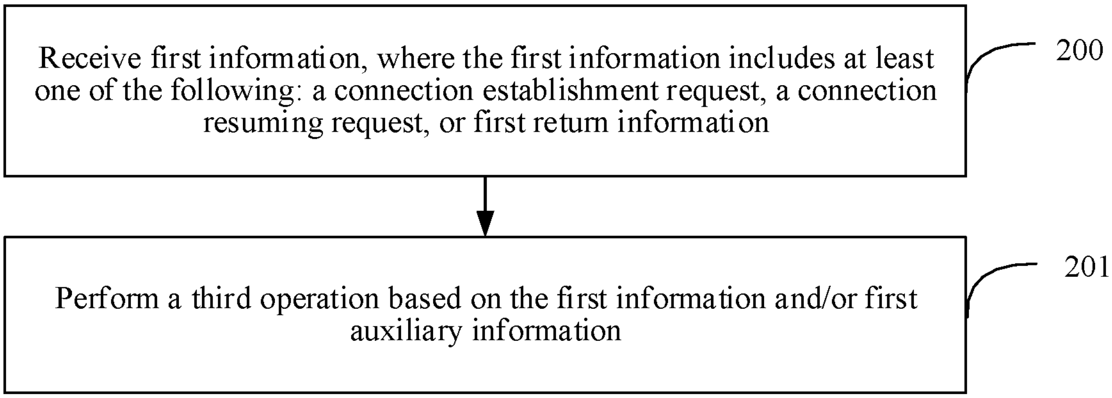
FIG. 2 is a schematic flowchart of an information processing method according to another embodiment of this application.

Referring to FIG. 2, the embodiments of this application provide another information processing method. The method is executed by a second communication device. The second communication device may be a communication device of a first network, including one of the following: a CN network element or a RAN network element. As shown in FIG. 2, the method includes the following steps:

Step 200: Receive first information, where the first information includes at least one of the following: a connection establishment request, a connection resuming request, or first return information.

Optionally, the first information is received from a terminal.

In an implementation, the second communication device receives a connection establishment request sent by the terminal. The connection establishment request includes first return information.

In an implementation, the second communication device receives a connection resuming request sent by the terminal. The connection establishment request includes first return information.

In an implementation, the second communication device receives a connection establishment request or a connection resuming request sent by the terminal.

The first return information includes at least one of the following:

first indication information used for indicating that the first auxiliary information is invalid;

second indication information used for indicating that the first auxiliary information is valid;

a return time or a planned leave time;

third indication information used for indicating a short-period return or a planned leave;

fourth indication information used for indicating a long-period return;

information used for blocking a downlink service and/or downlink data;

request information for a data channel; or updated first auxiliary information, where the request information for the data channel includes at least one of the following: indication information for requesting for skipping resuming the data channel; indication information for requesting for resuming the data channel connection, information about the data channel of which activation is requested, or information about the data channel of which inactivation is requested.

In an implementation, the second indication information includes at least one of the following: an indication for refusing to resume and/or establish a connection between the terminal and a network; an indication for refusing to resume and/or activate signaling and/or data transmission between the terminal and a network; an indication for refusing to accept paging; or a busy indication.

In an implementation, the indication for refusing to accept paging indicates that the terminal receives paging sent by the network, but refuses to accept the paging. The refusing to accept paging may indicate refusing to resume and/or establish a connection between the terminal and a network or refusing to resume and/or activate signaling and/or data transmission between the terminal and a network. In this case, the terminal may send, to the network, an indication for refusing to accept paging. Therefore, the terminal may request to resume or establish a connection with the network only for sending an indication for refusing to accept paging rather than really wanting to resume or establish the connection between the terminal and the network, and/or rather than really resuming and/or activating signaling and/or data transmission. In this case, the first auxiliary information provided by the terminal to the network may continue being valid. It is not difficult to understand that the indication for refusing to accept paging may be used for indicating that the first auxiliary information is valid.

In an implementation, the indication for refusing to resume and/or establish a connection between the terminal and a network indicates that the terminal receives paging sent by the network, but refuses to resume and/or establish a connection between the terminal and the network. In this case, the first auxiliary information provided by the terminal to the network may continue being valid. It is not difficult to understand that the indication for refusing to resume and/or establish a connection between the terminal and a network may be used for indicating that the first auxiliary information is valid.

In an implementation, the indication for refusing to resume and/or activate signaling and/or data transmission between the terminal and a network indicates that the terminal receives paging sent by the network, but refuses to resume and/or activate signaling and/or data transmission between the terminal and the network. In this case, the first auxiliary information provided by the terminal to the network may continue being valid. It is not difficult to understand that the indication for refusing to resume and/or activate signaling and/or data transmission between the terminal and a network may be used for indicating that the first auxiliary information is valid.

Step 201: Perform a third operation based on the first information and/or first auxiliary information.

Alternatively, the second communication device performs a third operation based on the first information and/or first auxiliary information.

The first auxiliary information includes information that is provided by the terminal to the first network and that is about an operation (the operation includes a blocking operation) performed on a connection between the terminal and the first network, a data channel related to the terminal, data related to the terminal, a service related to the terminal, and/or paging related to the terminal.

In the information processing method provided in this embodiment of this application, first information sent by the terminal is received, and a corresponding operation is performed based on the first information and/or first auxiliary information, which can save signaling and network resources.

Optionally, the third operation includes at least one of the following:

an operation related to invalidation of the first auxiliary information;

an operation related to validation of the first auxiliary information;

determining whether to release and/or suspend a connection between a terminal and a first network;

determining whether to activate the data channel;

determining whether to block downlink service and/or data;

an operation of skipping resuming the data channel connection;

an operation of releasing and/or suspending a connection between a terminal and a first network; or sending second confirmation information. In an implementation, the second confirmation information includes: indication information for confirming that the first auxiliary information is invalid or indication information for confirming that the first auxiliary information is valid.

Further, the operation related to invalidation of the first auxiliary information includes at least one of the following:

setting the first auxiliary information to be invalid or deleting the first auxiliary information;

canceling an operation (the operation may include a blocking operation) performed on the connection between the terminal and the first network, a data channel related to the terminal, data related to the terminal, a service related to the terminal, and/or paging related to the terminal according to the first auxiliary information;

resuming a data channel connection related to the terminal;

resuming a first data channel or canceling an operation of suspending a first data channel, where the first data channel includes a data channel suspended as indicated in the first auxiliary information;

resuming transmission of first data or stopping blocking first data, where the first data includes data blocked in the first network and/or data not transmitted to the terminal as required in the first auxiliary information;

receiving a first service or stopping blocking a first service, where the first service includes a service blocked in the first network and/or a service not transmitted to the terminal as required in the first auxiliary information; or resuming first paging or stopping blocking first paging, where the first service includes a type of paging blocked in the first network and/or a type of paging not transmitted to the terminal as indicated in the first auxiliary information.

Further, the operation related to validation of the first auxiliary information includes at least one of the following:

keeping the first auxiliary information valid;

keeping the operation performed on the connection between the terminal and the first network, the data channel related to the terminal, the data related to the terminal, the service related to the terminal, and/or the paging related to the terminal according to the first auxiliary information;

updating the first auxiliary information according to the updated first auxiliary information;

an operation performed on the connection between the terminal and the first network, the data channel related to the terminal, the data related to the terminal, the service related to the terminal, and/or the paging related to the terminal according to the updated first auxiliary information; or skipping resuming the data channel connection related to the terminal.

Further, the operation of releasing and/or suspending a connection between a terminal and a first network includes at least one of the following:

releasing or suspending a connection between a terminal and the first network locally; or setting a state of a connection between a terminal and the first network to a non-connected state.

In an implementation, the return time or the planned leave time is a return time or a planned leave time in the first return information or the return confirmation information.

In an implementation, whether to activate the data channel can be determined according to the return time or the planned leave time provided by the terminal. For example, when the return time or the planned leave time is not enough for activating the data channel, the data channel may not be activated.

The operation of skipping resuming the data channel connection includes at least one of the following: skipping resuming a data channel corresponding to the downlink service and/or the downlink data, skipping resuming all data channels, or skipping resuming a data channel corresponding to no uplink service and/or no uplink data.

Optionally, based on the content of the foregoing embodiments, the third operation may further include at least one of the following:

sending type information of a service and/or data related to the terminal to the terminal; or sending indication information requiring a non-access stratum NAS to complete a related message.

Alternatively, after receiving information sent by the terminal, the second communication device sends type information of a service and/or data related to the terminal to the terminal, to enable the terminal to reconfirm (double check), according to the type information of the service and/or the data, related content of the first return information, and reconfirms a short-period return to, a leave from, or a long-period return to the first network.

In an implementation, the service and/or the data related to the terminal includes at least one of the following: a service and/or data not blocked by the first auxiliary information, a service and/or data related to the terminal and cached, a service related to the terminal and initiated by the first network, or data related to the terminal and generated or received by the first network.

In an implementation, the sending type information of a service and/or data related to the terminal to the terminal refers to sending an acceptance-related message, such as a registration acceptance message or a service acceptance message, by using a NAS. In this case, an indication for requiring a NAS to complete a related message can be supported, and the terminal is required to return to the NAS, to complete the related message. It is not difficult to understand that because the terminal may change, according to the type information of the service and/or data of the terminal, a return decision or a decision about whether the first auxiliary information is valid, the second communication device may perform a third operation according to a reconfirmation from the terminal.

In the information processing method provided in this embodiment of this application, the third operation includes: sending type information of a service and/or data related to the terminal to the terminal and/or sending indication information requiring a non-access stratum NAS to complete a related message, which can effectively save signaling and network resources.

Optionally, in the information processing method provided in another embodiment of this application, after the step of sending type information of a service and/or data related to the terminal to the terminal, the method further includes:

receiving return confirmation information sent by the terminal; and performing the third operation according to the return confirmation information.

Alternatively, the second communication device receives return confirmation information sent by the terminal, and performs a third operation according to returning the return confirmation information.

The return confirmation information includes at least one of the following: return confirmation type information, the return time or the planned leave time, confirmation information of first auxiliary information, request information for a data channel, or updated first auxiliary information.

The return confirmation type information includes one of the following: fifth indication information used for indicating a short-period return or used for indicating a leave or sixth indication information used for indicating a long-period return or used for indicating a return.

The confirmation information of the first auxiliary information includes one of following: seventh indication information used for indicating that the first auxiliary information is valid or eighth indication information used for indicating that the first auxiliary information is invalid.

In an implementation, the second communication device receives return confirmation type information sent by the terminal and performs an operation related to validation of the first auxiliary information if the return confirmation type information includes is fifth indication information used for indicating a short-period return or used for indicating a leave.

In an implementation, the second communication device receives return confirmation type information sent by the terminal and performs an operation related to invalidation of the first auxiliary information if the return confirmation type information includes is sixth indication information used for indicating a long-period return or used for indicating a return.

In an implementation, the second communication device receives a return time or a planned leave time sent by the terminal, and performs an operation of releasing and/or suspending the connection between the terminal and the first network when the return time arrives or the planned leave time arrives.

In an implementation, the second communication device receives confirmation information of first auxiliary information sent by the terminal, and performs an operation related to validation of the first auxiliary information if the confirmation information of the first auxiliary information is seventh indication information used for indicating that the first auxiliary information is valid.

Optionally, the seventh indication information includes at least one of the following: a confirmation of an indication for refusing to accept paging (for example, a confirmation of a busy indication); a confirmation of refusing to resume and/or activate signaling and/or data transmission between the terminal and the network; or a confirmation of an indication for skipping resuming and/or establishing a connection between the terminal and the network. In an implementation, after sending second indication information, the terminal receives type information of a service and/or data sent by the first network, and the terminal can reconfirm the seventh indication information according to the type information of the service and/or the data, and send the seventh indication information. For example, the terminal still refuses to accept paging, still refuses to resume and/or establish a connection between the terminal and the network, and/or still refuses to resume and/or activate signaling and/or data transmission between the terminal and the network. In this case, the first auxiliary information provided by the terminal to the network may continue being valid. It is not difficult to understand that a confirmation of an indication for refusing to accept paging (for example, a confirmation of a busy indication); a confirmation of refusing to resume and/or activate signaling and/or data transmission between the terminal and the network; and/or a confirmation of an indication for skipping resuming and/or establishing a connection between the terminal and the network can be used for indicating that the first auxiliary information is valid.

In an implementation, the second communication device receives confirmation information of first auxiliary information sent by the terminal, and performs an operation related to invalidation of the first auxiliary information if the confirmation information of the first auxiliary information is eighth indication information used for indicating that the first auxiliary information is invalid.

In an implementation, the second communication device receives information about the data channel of which activation is requested sent by the terminal, and activates a corresponding data channel according to the information about the data channel of which activation is requested.

In an implementation, the second communication device receives updated first auxiliary information and updates the first auxiliary information according to the updated first auxiliary information, or performs an operation on the connection between the terminal and the first network, the data channel related to the terminal, the data related to the terminal, the service related to the terminal, and/or the paging related to the terminal according to the updated first auxiliary information.

In the information processing method provided in this embodiment of this application, after the type information of the service and/or the data is sent to the terminal, return confirmation information sent by the terminal is received, and a third operation is performed according to the return confirmation information, which can effectively save signaling and network resources.

Optionally, an operation related to invalidation of the first auxiliary information is performed in a case that a fourth condition is satisfied.

The fourth condition includes at least one of the following:

a connection establishment request or a connection resuming request for the first network is received from the terminal;

the terminal and the first network establish a connection and/or resume a connection;

the first return information is empty or the first return information is not received;

the first return information includes at least one of the following: first indication information used for indicating invalidation of the first auxiliary information, fourth indication information used for indicating a long-period return, or request information used for resuming a data connection channel; or the return confirmation information includes at least one of the following: sixth indication information used for indicating a long-period return or used for indicating a return and eighth indication information used for indicating that the first auxiliary information is invalid.

Optionally, an operation related to validation of the first auxiliary information is performed in a case that a fifth condition is satisfied.

The fifth condition includes at least one of the following:

the first return information includes at least one of the following: second indication information used for indicating that the first auxiliary information is valid, updated first auxiliary information, a duration of returning to the first network, third indication information used for indicating a short-period return or a planned leave, or information used for blocking a downlink service and/or downlink data; or the return confirmation information includes at least one of the following: fifth indication information used for indicating a short-period return or used for indicating a leave and seventh indication information used for indicating the determining that the first auxiliary information is valid.

Optionally, an operation of releasing and/or suspending a connection between a terminal and a first network is performed in a case that a sixth condition is satisfied;

The sixth condition includes at least one of the following: the fifth indication information used for indicating a leave is received; or a return time arrives or a planned leave time arrives.

Additionally/Alternatively, an operation of blocking the downlink service and/or data is performed in a case that a seventh condition is satisfied.

The seventh condition includes at least one of the following: information used for blocking the downlink service and/or the downlink data is received.

Additionally/Alternatively, an operation of skipping resuming the data channel connection is performed in a case that an eighth condition is satisfied.

The eighth condition includes at least one of the following: information used for blocking the downlink service and/or the downlink data is received; or the request information for the data channel is received, and the request information for the data channel includes indication information for requesting for skipping resuming the data channel.

In the information processing method provided in this embodiment of this application, various situations of performing the third operation are provided, to effectively save signaling and network resources.

Figure 3:
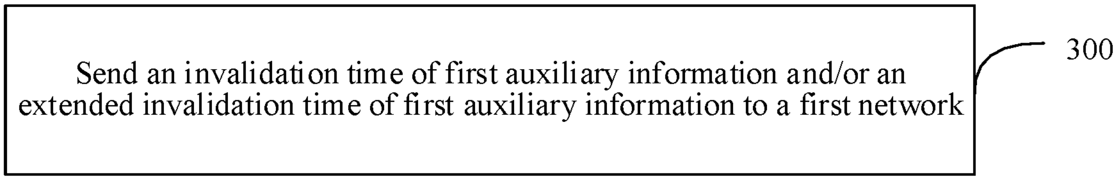
FIG. 3 is a schematic flowchart of an information processing method according to still another embodiment of this application.

Referring to FIG. 3, the embodiments of this application provide another information processing method. The method is executed by a third communication device. The third communication device may be a terminal. As shown in FIG. 3, the information processing method includes following step:

Step 300: Send an invalidation time of first auxiliary information and/or an extended invalidation time of first auxiliary information to a first network.

The first auxiliary information includes information that is provided by the terminal to the first network and that is about an operation performed on a connection between the terminal and the first network, a data channel related to the terminal, data related to the terminal, a service related to the terminal, and/or paging related to the terminal. The operation includes a blocking operation.

In an implementation, the invalidation time of the first auxiliary information includes an invalidation duration of the first auxiliary information.

In an implementation, when leaving the first network, the terminal provides first auxiliary information to the first network, and simultaneously provides an invalidation time of first auxiliary information and/or an extended invalidation time of first auxiliary information.

It may be understood that, the first auxiliary information becomes invalid when the invalidation time of the first auxiliary information and/or the extended invalidation time of the first auxiliary information In the information processing method provided in this embodiment of this application, the terminal can invalidate, by sending the invalidation time of the first auxiliary information and/or the extended invalidation time of the first auxiliary information to the first network, the first auxiliary information without returning to the first network or leaving the second network, thereby saving signaling and network resources.

Optionally, the invalidation time of the first auxiliary information is used for the first network to perform an operation related to invalidation of the first auxiliary information based on the invalidation time.

In an implementation, the terminal sends the invalidation time of the first auxiliary information to the first network, and the first network performs an operation related to invalidation of the first auxiliary information when the invalidation time of the first auxiliary information arrives.

The operation related to invalidation of the first auxiliary information includes at least one of the following:

setting the first auxiliary information to be invalid or deleting the first auxiliary information;

canceling an operation performed on the connection between the terminal and the first network, a data channel related to the terminal, data related to the terminal, a service related to the terminal, and/or paging related to the terminal according to the first auxiliary information;

resuming a data channel connection related to the terminal;

resuming a first data channel or canceling an operation of suspending a first data channel, where the first data channel includes a data channel suspended as indicated in the first auxiliary information;

resuming transmission of first data or stopping blocking first data, where the first data includes data blocked in the first network and/or data not transmitted to the terminal as required in the first auxiliary information;

receiving a first service or stopping blocking a first service, where the first service includes a service blocked in the first network and/or a service not transmitted to the terminal as required in the first auxiliary information; or resuming first paging or stopping blocking first paging, where the first service includes a type of paging blocked in the first network and/or a type of paging not transmitted to the terminal as indicated in the first auxiliary information;

In the information processing method provided in this embodiment of this application, various situations of performing the operation related to invalidation of the first auxiliary information are provided, to effectively save signaling and network resources.

Figure 4:
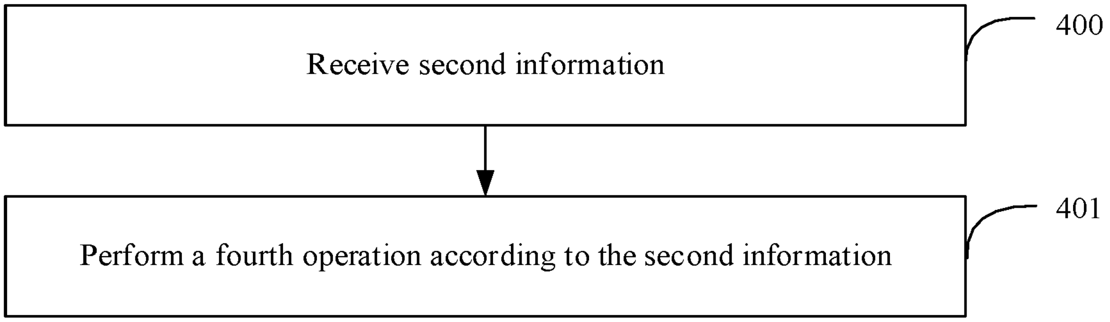
FIG. 4 is a schematic flowchart of an information processing method according to still another embodiment of this application.

Referring to FIG. 4, the embodiments of this application provide another information processing method. The method is executed by a fourth communication device. The fourth communication device may be a CN network element or a RAN network element. As shown in FIG. 4, this method includes following steps:

Step 400: Receive second information.

The second information includes at least one of the following: a validation time of first auxiliary information or invalidation time of first auxiliary information, an extended validation time of first auxiliary information, or an extended invalidation time of first auxiliary information.

Step 401: Perform a fourth operation according to the second information.

Alternatively, the fourth communication device performs a fourth operation according to the second information.

Further, the fourth operation includes at least one of the following:

an operation related to invalidation of the first auxiliary information; or an operation related to validation of the first auxiliary information.

The operation related to invalidation of the first auxiliary information includes at least one of the following:

setting the first auxiliary information to be invalid or deleting the first auxiliary information;

canceling an operation performed on the connection between the terminal and the first network, a data channel related to the terminal, data related to the terminal, a service related to the terminal, and/or paging related to the terminal according to the first auxiliary information, where the operation includes a blocking operation;

resuming a data channel connection related to the terminal;

resuming a first data channel or canceling an operation of suspending a first data channel, where the first data channel includes a data channel suspended as indicated in the first auxiliary information;

resuming transmission of first data or stopping blocking (block) first data, where the first data includes data blocked in the first network and/or data not transmitted to the terminal as required in the first auxiliary information;

receiving a first service or stopping blocking a first service, where the first service includes a service blocked in the first network and/or a service not transmitted to the terminal as required in the first auxiliary information; or resuming first paging or stopping blocking first paging, where the first service includes a type of paging blocked in the first network and/or a type of paging not transmitted to the terminal as indicated in the first auxiliary information.

The operation related to validation of the first auxiliary information includes at least one of the following:

keeping the first auxiliary information continuously valid;

keeping the operation performed on the connection between the terminal and the first network, the data channel related to the terminal, the data related to the terminal, the service related to the terminal, and/or the paging related to the terminal according to the first auxiliary information;

updating the first auxiliary information according to the updated first auxiliary information;

an operation performed on the connection between the terminal and the first network, the data channel related to the terminal, the data related to the terminal, the service related to the terminal, and/or the paging related to the terminal according to the updated first auxiliary information;

skipping resuming the data channel connection related to the terminal; or extending the invalidation time of the first auxiliary information.

Optionally, in another embodiment of this application, an operation related to invalidation of the first auxiliary information is performed in a case that a ninth condition is satisfied.

The ninth condition includes at least one of the following:

the terminal does not return to the first network before the validation time of the terminal expires or before the invalidation time starts;

the validation time expires; or the invalidation time arrives.

Additionally/Alternatively, an operation related to validation of the first auxiliary information is performed in a case that a tenth condition is satisfied.

The tenth condition includes at least one of the following: the extended invalidation time of the first auxiliary information is received, the extended validation time of the first auxiliary information is received, it is before the validation time of the first auxiliary information expires, and it is before the invalidation time of the first auxiliary information starts.

In the information processing method provided in this embodiment of this application, the first network receives the invalidation time of the first auxiliary information and/or the extended invalidation time of the first auxiliary information sent by the terminal, so that first auxiliary information can be invalidated or kept valid without returning to the first network or leaving the second network, thereby saving signaling and network resources.

Figure 5:
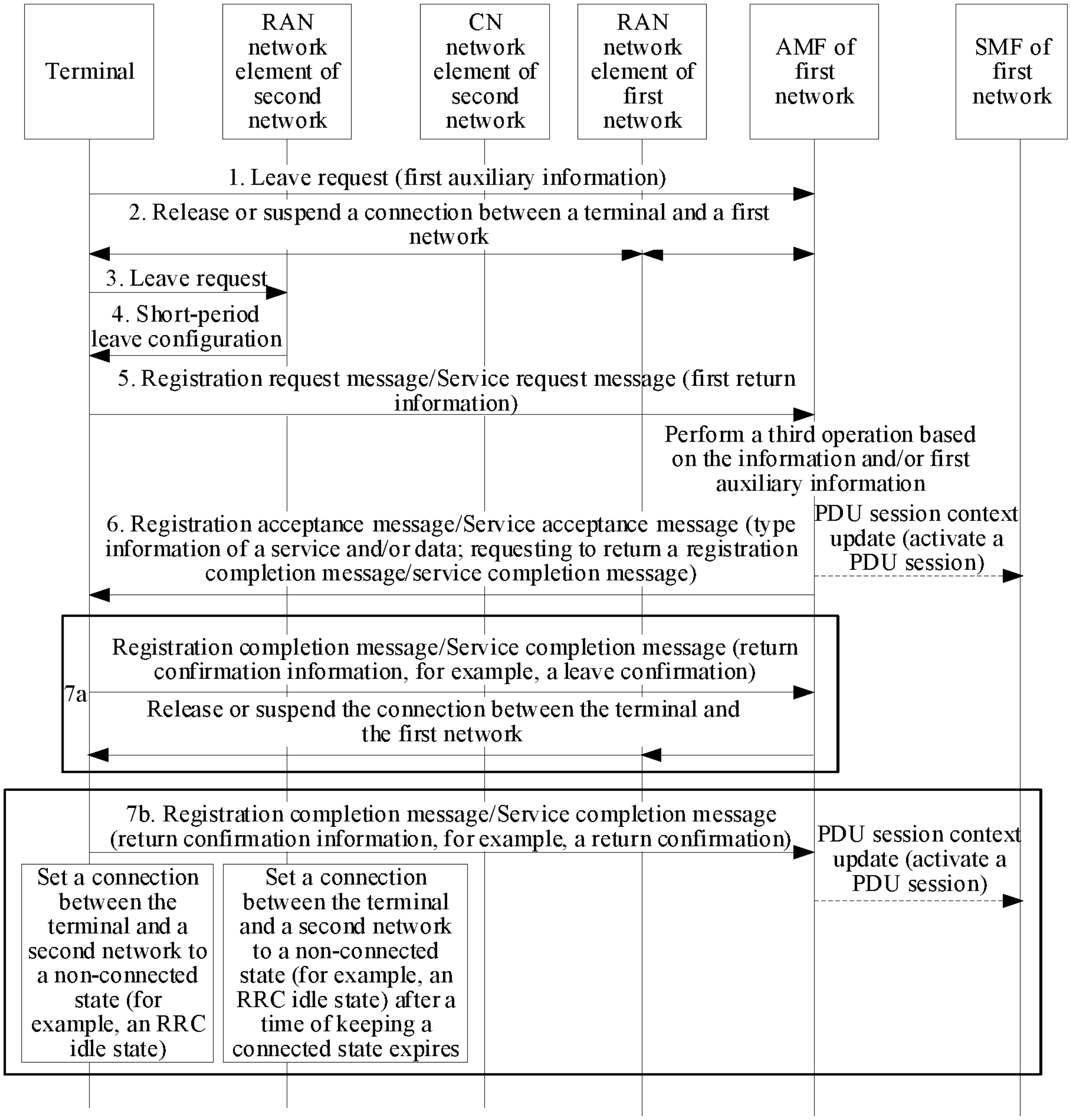
FIG. 5 is a schematic flowchart of an information processing method according to still another embodiment of this application.

FIG. 5 is a schematic flowchart of an information processing method according to still another embodiment of this application. The information processing method includes the following steps:

Step 1: A terminal sends a leave request to an AMF network element of a first network, where the leave request carries first auxiliary information.

Step 2: Release or suspend a connection between the terminal and the first network.

Step 3: The terminal sends a leave request to a RAN network element of the second network.

Step 4: The terminal receive short-period leave configuration information from the RAN network element of the second network.

Step 5: The terminal sends a registration request message/service request message to the AMF network element of the first network, where the registration request message/service request message includes first return information.

The AMF network element of the first network performs a third operation based on the first return message and/or the first auxiliary information.

Step 6: The terminal receives a registration acceptance message/service acceptance message sent by the AMF network element of the first network, where the registration acceptance message/service reception message includes type information of a service and/or data.

Step 7*a*: The terminal sends a registration completion message/service completion message to the AMF network element of the first network, where if the registration completion message/service completion message includes leave confirmation information, for example, for confirming a leave, a connection between the terminal and the first network is released or suspended; or step 7*b*: The terminal sends a registration completion message/service completion message to the AMF network element of the first network, where if the registration completion message/service completion message includes return confirmation information, for example, for confirming a return, the terminal sets a connection with the second network to a non-connected state, or after a time of a connected state expires, the terminal sets a connection with the second network to a non-connected state, and the AMF network element of the first network can activate a PDU session.

For operations and information included in the foregoing steps, refer to the information processing method described in the embodiments of FIG. 1 and FIG. 2. Details are not described herein again.

Figure 6:
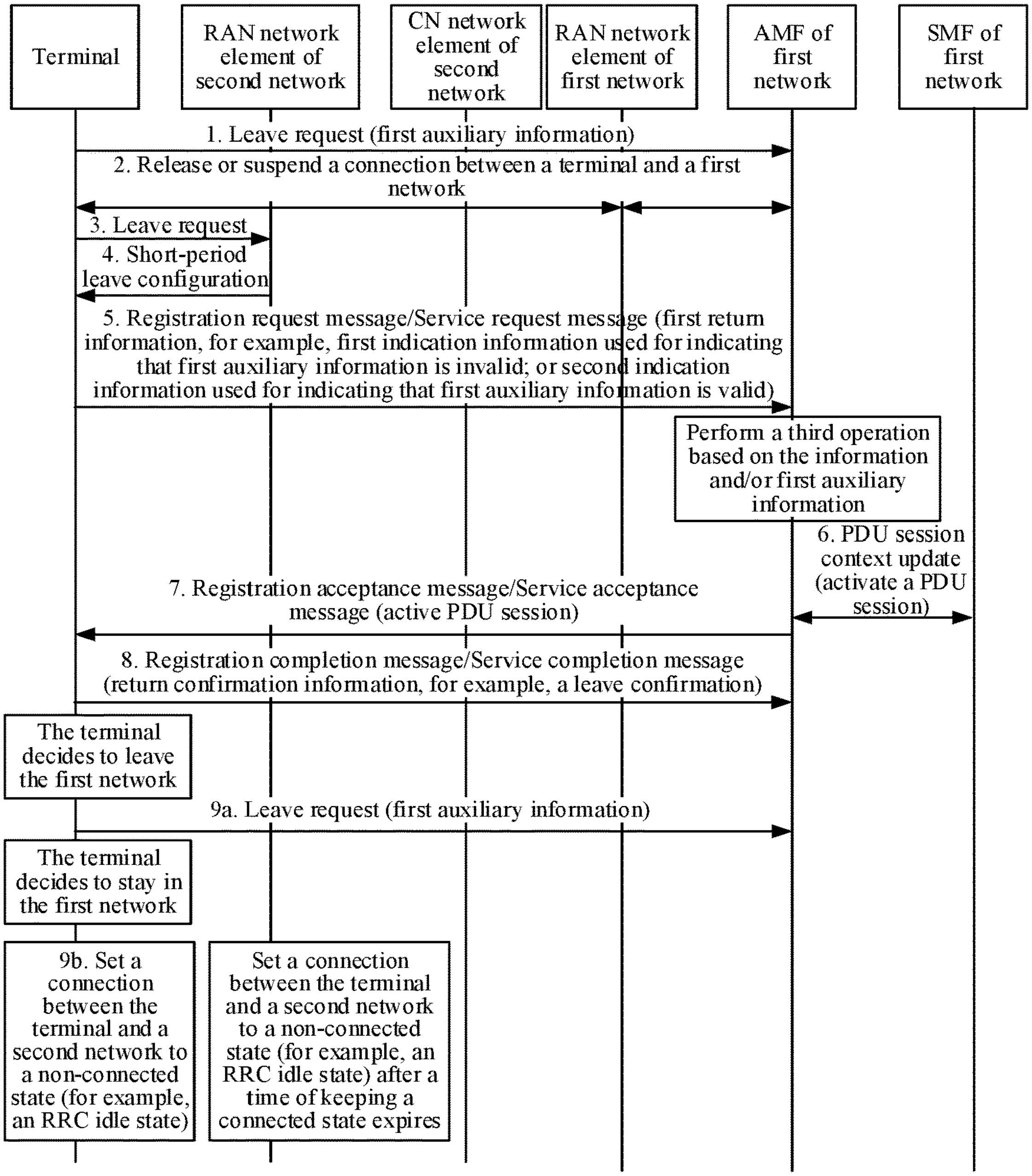
FIG. 6 is a schematic flowchart of an information processing method according to still another embodiment of this application.

FIG. 6 is a schematic flowchart of an information processing method according to another embodiment of this application. The information processing method includes the following steps:

Step 1: A terminal sends a leave request to an AMF network element of a first network, where the leave request carries first auxiliary information.

Step 2: Release or suspend a connection between the terminal and the first network.

Step 3: The terminal sends a leave request to a RAN network element of the second network.

Step 4: The terminal receive short-period leave configuration information from the RAN network element of the second network.

Step 5: The terminal sends a registration request message/service request message to the AMF network element of the first network, where the registration request message/service request message includes first return information, for example, first indication information used for indicating that the first auxiliary information is invalid or second indication information used for indicating that the first auxiliary information is valid.

The AMF network element of the first network performs a third operation based on the first return message and/or the first auxiliary information.

Step 6: The AMF network element of the first network receives a PDU session context update (active PDU session).

Step 7: The terminal receives a registration acceptance message/service reception message sent by the AMF network element of the first network, where the registration acceptance message/service reception message includes an activated PDU session.

Step 8: The terminal sends a registration completion message/service completion message to the AMF network element of the first network, where the registration completion message/service completion message includes return confirmation information, for example, for confirming a leave.

Step 9*a*: The terminal sends a leave request to an AMF network element of a first network, where the leave request carries first auxiliary information.

Step 9*b*: The terminal decides to stay in the first network, and the terminal sets a connection with the second network to a non-connected state, or after a time of keeping a connected state expires, the terminal sets a connection with the second network to a non-connected state.

For operations and information included in the foregoing steps, refer to the information processing method described in the embodiments of FIG. 1 and FIG. 2. Details are not described herein again.

Figure 7:
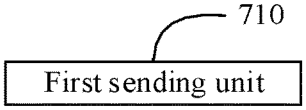
FIG. 7 is a schematic structural diagram of an information processing apparatus according to still another embodiment of this application.

FIG. 7 is a schematic structural diagram of an information processing apparatus according to still another embodiment of this application. The information processing apparatus includes:

a first sending unit 710, configured to send first information to a first network, where the first information includes at least one of the following: a connection establishment request, a connection resuming request, or first return information.

Optionally, the first sending unit is configured to:

send the first return information in a case that a first condition is satisfied.

The first condition includes at least one of the following:

a terminal leaves a second network or a terminal leaves a second network for a short period;

a terminal returns to the first network or a terminal returns to the first network for a short period;

a terminal has left the first network; or a terminal has provided first auxiliary information to the first network.

Optionally, the first return information includes at least one of the following:

first indication information used for indicating that the first auxiliary information is invalid;

second indication information used for indicating that the first auxiliary information is valid;

a return time or a planned leave time;

third indication information used for indicating a short-period return or a planned leave;

fourth indication information used for indicating a long-period return;

information used for blocking a downlink service and/or downlink data;

request information for a data channel; or updated first auxiliary information.

The request information for the data channel includes at least one of the following: indication information for requesting for skipping resuming the data channel; indication information for requesting for resuming the data channel connection, information about the data channel of which activation is requested, or information about the data channel of which inactivation is requested.

Optionally, the second indication information includes at least one of the following:

an indication for refusing to resume and/or establish a connection between the terminal and a network;

an indication for refusing to resume and/or activate signaling and/or data transmission between the terminal and a network;

an indication for refusing to accept paging; or a busy indication.

Optionally, the apparatus further includes:

a first receiving unit, configured to receive type information of a service and/or data sent by the first network; and a re-determining unit, configured to perform at least one of the following according to the type information of the service and/or the data:

re-determining a return type of a return to the first network, where the return type includes a long-period return or a short-period return;

re-determining to return to or leave from the first network;

re-determining whether the first auxiliary information is valid;

re-determining a leave type of a leave from the second network, where the leave type includes a long-period leave or a short-period leave;

determining whether to extend or delay a return time or a planned leave time;

determining whether to request the first network to activate a data channel corresponding to the service and/or the data;

determining whether to request the first network to block the service and/or the data;

determining whether to request the first network to suspend a data channel corresponding to the service and/or the data;

determining whether to update the first auxiliary information;

determining whether to release or suspend a connection with the second network locally;

determining whether to set a state of a connection with the second network to a non-connected state;

sending return confirmation information to the first network; or sending leave confirmation information to the second network.

The return confirmation information includes at least one of the following: return confirmation type information, the return time or the planned leave time, confirmation information of first auxiliary information, request information for a data channel, or updated first auxiliary information.

The return confirmation type information includes one of the following: fifth indication information used for indicating a short-period return or used for indicating a leave or sixth indication information used for indicating a long-period return or used for indicating a return.

The confirmation information of the first auxiliary information includes one of following: seventh indication information used for indicating that the first auxiliary information is valid or eighth indication information used for indicating that the first auxiliary information is invalid.

The leave confirmation information includes one of the following: first leave indication information used for indicating a short-period leave or second leave indication information used for indicating a long-period leave.

Optionally, the apparatus further includes a fifth receiving unit, configured to receive second confirmation information. The second confirmation information includes: indication information for confirming that the first auxiliary information is invalid or indication information for confirming that the first auxiliary information is valid.

Optionally, the apparatus further includes:

a first execution unit, configured to perform a first operation in a case that a second condition is satisfied, where the first operation includes at least one of the following:

sending at least one of the following to the first network: the sixth indication information used for indicating a long-period return or used for indicating a return, the eighth indication information used for indicating that the first auxiliary information is invalid, or the request information for the data channel;

sending the second leave indication information to the second network;

releasing or suspending the connection with the second network locally; or setting the state of the connection with the second network to the non-connected state, where the second condition includes at least one of the following:

it is re-determined that the return type of the return to the first network is the long-period return;

it is re-determined that the leave type of the leave from the second network is the long-period leave; or it is re-determined that the first auxiliary information is invalid;

and/or perform a second operation in a case that a third condition is satisfied, where the second operation includes at least one of the following:

sending at least one of the following to the first network: the fifth indication information used for indicating a short-period return or used for indicating a leave, the seventh indication information used for indicating that the first auxiliary information is valid, the return time or the planned leave time, the request information for the data channel, or the updated first auxiliary information;

sending the first leave indication information to the second network; or performing at least one of the following when the fifth indication information is used for indicating that the leave or return time arrives, the planned leave time arrives, and/or an objective of the short-period return to the first network is achieved: sending a leave request and/or the updated first auxiliary information to the first network; releasing or suspending the connection with the first network locally; setting the state of the connection with the first network to the non-connected state; sending, to the second network, indication information indicating a return; or establishing or resuming the connection with the second network locally, where the third condition includes at least one of the following:

it is re-determined that the return type of the return to the first network is the short-period return;

it is re-determined that the leave type of the leave from the second network is the short-period leave; or it is re-determined that the first auxiliary information is valid.

Optionally, in a case that the first return information is empty, or the first information does not include the first return information, it indicates a long-period return.

Optionally, the apparatus further includes:

a second execution unit, configured to perform at least one of the following when fifth indication information is used for indicating that a leave or return time arrives, a planned leave time arrives, and/or an objective of a short-period return to the first network is achieved:

sending a leave request and/or updated first auxiliary information to the first network;

releasing or suspending a connection between a terminal and the first network locally;

setting a state of a connection between a terminal and the first network to a non-connected state;

sending, to a second network, indication information indicating a return; or establishing or resuming a connection between a terminal and a second network locally, where the return time is a return time in the first return information or return confirmation information; and the leave time is a planned leave time in the first return information or the return confirmation information.

The information processing apparatus in the embodiments of this application may be an apparatus or may be a component, an integrated circuit, or a chip in a terminal. The apparatus may be a mobile electronic device or may be a non-mobile electronic device. For example, the mobile electronic device may be a mobile phone, a tablet computer, a notebook computer, a palm computer, an in-vehicle electronic device, a wearable device, an ultra-mobile personal computer (ultra-mobile personal computer, UMPC), a netbook, or a personal digital assistant (personal digital assistant, PDA); and the non-mobile electronic device may be a server, a network attached storage (Network Attached Storage, NAS), a personal computer (personal computer, PC), a television (television, TV), a teller machine, or an automated machine, which are not specifically limited in the embodiments of this application.

The information processing apparatus in the embodiments of this application may be an apparatus with an operating system. The operating system may be an Android (Android) operating system, may be an iOS operating system, or may be another possible operating system, and is not specifically limited in the embodiments of this application.

The information processing apparatus provided in this embodiment of this application can implement various processes implemented by the information processing method in the method embodiment of FIG. 1. To avoid repetition, details are not described herein again.

In the information processing apparatus provided in the embodiments of this application, the first information is sent to the first network, to process, when the terminal returns to the network, the first auxiliary information and/or indicate an operation performed by the first network based on the first auxiliary information, which can save signaling and network resources.

Figure 8:
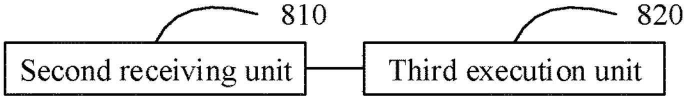
FIG. 8 is a schematic structural diagram of an information processing apparatus according to still another embodiment of this application.

FIG. 8 is a schematic structural diagram of an information processing apparatus according to still another embodiment of this application. The information processing apparatus includes a second receiving unit 810 and a third execution unit 820.

The second receiving unit 810 is configured to receive first information, where the first information includes at least one of the following: a connection establishment request, a connection resuming request, or first return information.

The third execution unit 820 configured to perform a third operation based on the first information and/or first auxiliary information.

The first return information includes at least one of the following:

first indication information used for indicating that the first auxiliary information is invalid;

second indication information used for indicating that the first auxiliary information is valid;

a return time or a planned leave time;

third indication information used for indicating a short-period return or a planned leave;

fourth indication information used for indicating a long-period return;

information used for blocking a downlink service and/or downlink data;

request information for a data channel; or updated first auxiliary information, where the request information for the data channel includes at least one of the following: indication information for requesting for skipping resuming the data channel; indication information for requesting for resuming the data channel connection, information about the data channel of which activation is requested, or information about the data channel of which inactivation is requested.

Optionally, the second indication information includes at least one of the following:

an indication for refusing to resume and/or establish a connection between the terminal and a network;

an indication for refusing to resume and/or activate signaling and/or data transmission between the terminal and a network;

an indication for refusing to accept paging; or a busy indication. Optionally, the third operation includes at least one of the following:

an operation related to invalidation of the first auxiliary information;

an operation related to validation of the first auxiliary information;

determining whether to release and/or suspend a connection between a terminal and a first network;

determining whether to activate the data channel;

determining whether to block downlink service and/or data;

an operation of skipping resuming the data channel connection;

an operation of releasing and/or suspending a connection between a terminal and a first network; or sending second confirmation information.

Optionally, the second confirmation information includes: indication information for confirming that the first auxiliary information is invalid or indication information for confirming that the first auxiliary information is valid.

Optionally, the operation related to invalidation of the first auxiliary information includes at least one of the following:

setting the first auxiliary information to be invalid or deleting the first auxiliary information;

canceling an operation performed on the connection between the terminal and the first network, a data channel related to the terminal, data related to the terminal, a service related to the terminal, and/or paging related to the terminal according to the first auxiliary information;

resuming a data channel connection related to the terminal;

resuming a first data channel or canceling an operation of suspending a first data channel, where the first data channel includes a data channel suspended as indicated in the first auxiliary information;

resuming transmission of first data or stopping blocking first data, where the first data includes data blocked in the first network and/or data not transmitted to the terminal as required in the first auxiliary information;

receiving a first service or stopping blocking a first service, where the first service includes a service blocked in the first network and/or a service not transmitted to the terminal as required in the first auxiliary information; or resuming first paging or stopping blocking first paging, where the first service includes a type of paging blocked in the first network and/or a type of paging not transmitted to the terminal as indicated in the first auxiliary information.

Additionally/Alternatively, the operation related to validation of the first auxiliary information includes at least one of the following:

keeping the first auxiliary information valid;

keeping the operation performed on the connection between the terminal and the first network, the data channel related to the terminal, the data related to the terminal, the service related to the terminal, and/or the paging related to the terminal according to the first auxiliary information;

updating the first auxiliary information according to the updated first auxiliary information;

an operation performed on the connection between the terminal and the first network, the data channel related to the terminal, the data related to the terminal, the service related to the terminal, and/or the paging related to the terminal according to the updated first auxiliary information; or skipping resuming the data channel connection related to the terminal.

Additionally/Alternatively, the operation of releasing and/or suspending a connection between a terminal and a first network includes at least one of the following:

releasing or suspending a connection between a terminal and the first network locally; or setting a state of a connection between a terminal and the first network to a non-connected state.

Additionally/Alternatively, the operation of skipping resuming the data channel connection includes at least one of the following: skipping resuming a data channel corresponding to the downlink service and/or the downlink data, skipping resuming all data channels, or skipping resuming a data channel corresponding to no uplink service and/or no uplink data.

Optionally, the third operation further includes at least one of the following:

sending type information of a service and/or data related to the terminal to the terminal; or sending indication information requiring a non-access stratum NAS to complete a related message.

Optionally, the apparatus further includes:

a third receiving unit, configured to receive return confirmation information sent by the terminal; and a fourth execution unit, configured to perform the third operation according to the return confirmation information.

The return confirmation information includes at least one of the following: return confirmation type information, the return time or the planned leave time, confirmation information of first auxiliary information, request information for a data channel, or updated first auxiliary information.

The return confirmation type information includes one of the following: fifth indication information used for indicating a short-period return or used for indicating a leave or sixth indication information used for indicating a long-period return or used for indicating a return.

The confirmation information of the first auxiliary information includes one of following: seventh indication information used for indicating that the first auxiliary information is valid or eighth indication information used for indicating that the first auxiliary information is invalid.

Optionally, the performing the third operation includes:

performing an operation related to invalidation of the first auxiliary information in a case that a fourth condition is satisfied, where the fourth condition includes at least one of the following:

a connection establishment request or a connection resuming request for the first network is received from the terminal;

the terminal and the first network establish a connection and/or resume a connection;

the first return information is empty or the first return information is not received;

the first return information includes at least one of the following: first indication information used for indicating invalidation of the first auxiliary information, fourth indication information used for indicating a long-period return, or request information used for resuming a data connection channel; or the return confirmation information includes at least one of the following: sixth indication information used for indicating a long-period return or used for indicating a return and eighth indication information used for indicating that the first auxiliary information is invalid;

and/or performing an operation related to validation of the first auxiliary information in a case that a fifth condition is satisfied, where the fifth condition includes at least one of the following:

the first return information includes at least one of the following: second indication information used for indicating that the first auxiliary information is valid, updated first auxiliary information, a duration of returning to the first network, third indication information used for indicating a short-period return or a planned leave, or information used for blocking a downlink service and/or downlink data;

the return confirmation information includes at least one of the following: fifth indication information used for indicating a short-period return or used for indicating a leave and seventh indication information used for indicating the determining that the first auxiliary information is valid;

and/or performing, in a case that a sixth condition is satisfied, an operation of releasing and/or suspending a connection between a terminal and a first network;

the sixth condition includes at least one of the following: the fifth indication information used for indicating a leave is received; or a return time arrives or a planned leave time arrives;

and/or performing, in a case that a seventh condition is satisfied, an operation of blocking the downlink service and/or data;

the seventh condition includes at least one of the following: information used for blocking the downlink service and/or the downlink data is received;

and/or performing an operation of skipping resuming the data channel connection in a case that an eighth condition is satisfied, where the eighth condition includes at least one of the following: information used for blocking the downlink service and/or the downlink data is received; or the request information for the data channel is received, and the request information for the data channel includes indication information for requesting for skipping resuming the data channel.

The information processing apparatus in the embodiments of this application may be an apparatus or may be a component, an integrated circuit, or a chip in a terminal. The apparatus may be a mobile electronic device or may be a non-mobile electronic device. For example, the mobile electronic device may be a mobile phone, a tablet computer, a notebook computer, a palm computer, an in-vehicle electronic device, a wearable device, an ultra-mobile personal computer (UMPC), a netbook, or a personal digital assistant (PDA); and the non-mobile electronic device may be a server, a network attached storage (NAS), a personal computer (PC), a television (TV), a teller machine, or an automated machine, which are not specifically limited in the embodiments of this application.

The information processing apparatus in the embodiments of this application may be an apparatus with an operating system. The operating system may be an Android (Android) operating system, may be an iOS operating system, or may be another possible operating system, and is not specifically limited in the embodiments of this application.

The information processing apparatus provided in this embodiment of this application can implement various processes implemented by the information processing method in the method embodiment of FIG. 2. To avoid repetition, details are not described herein again.

The information processing apparatus provided in this embodiment of this application receives first information sent by the terminal, and performs a corresponding operation based on the first information and/or first auxiliary information, which can save signaling and network resources.

Figure 9:
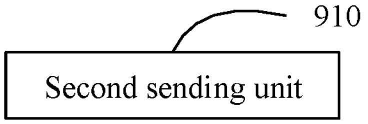
FIG. 9 is a schematic structural diagram of an information processing apparatus according to still another embodiment of this application.

FIG. 9 is a schematic structural diagram of an information processing apparatus according to an embodiment of this application. The information processing apparatus includes:

a second sending unit 910, configured to send an invalidation time of first auxiliary information and/or an extended invalidation time of first auxiliary information to a first network.

Optionally, the invalidation time of the first auxiliary information is used for the first network to perform an operation related to invalidation of the first auxiliary information based on the invalidation time.

The information processing apparatus in the embodiments of this application may be an apparatus or may be a component, an integrated circuit, or a chip in a terminal. The apparatus may be a mobile electronic device or may be a non-mobile electronic device. For example, the mobile electronic device may be a mobile phone, a tablet computer, a notebook computer, a palm computer, an in-vehicle electronic device, a wearable device, an ultra-mobile personal computer (UMPC), a netbook, or a personal digital assistant (PDA); and the non-mobile electronic device may be a server, a network attached storage (NAS), a personal computer (personal computer, PC), a television (TV), a teller machine, or an automated machine, which are not specifically limited in the embodiments of this application.

The information processing apparatus in the embodiments of this application may be an apparatus with an operating system. The operating system may be an Android operating system, may be an iOS operating system, or may be another possible operating system, and is not specifically limited in the embodiments of this application.

The information processing apparatus provided in this embodiment of this application can implement various processes implemented by the information processing method in the method embodiment of FIG. 3. To avoid repetition, details are not described herein again.

In the information processing apparatus provided in this embodiment of this application can invalidate, by sending the invalidation time of the first auxiliary information and/or the extended invalidation time of the first auxiliary information to the first network, the first auxiliary information without returning to the first network or leaving the second network, thereby saving signaling and network resources.

Figure 10:
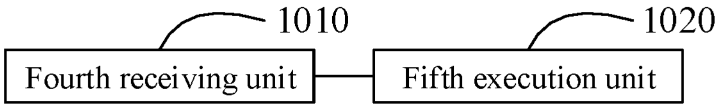
FIG. 10 is a schematic structural diagram of an information processing apparatus according to still another embodiment of this application.

FIG. 10 is a schematic structural diagram of an information processing apparatus according to still another embodiment of this application. The information processing apparatus includes a fourth receiving unit 1010 and a fifth execution unit 1020.

The fourth receiving unit 1010 is configured to receive second information, where the second information includes at least one of the following: a validation time of first auxiliary information or invalidation time of first auxiliary information, an extended validation time of first auxiliary information, or an extended invalidation time of first auxiliary information.

The fifth execution unit 1020 is configured to perform a fourth operation according to the second information.

Optionally, the fourth operation includes at least one of the following:

an operation related to invalidation of the first auxiliary information; or an operation related to validation of the first auxiliary information.

Optionally, the operation related to invalidation of the first auxiliary information includes at least one of the following:

setting the first auxiliary information to be invalid or deleting the first auxiliary information;

canceling an operation performed on a connection between a terminal and a first network, a data channel related to the terminal, data related to the terminal, a service related to the terminal, and/or paging related to the terminal according to the first auxiliary information;

resuming a data channel connection related to the terminal;

resuming a first data channel or canceling an operation of suspending a first data channel, where the first data channel includes a data channel suspended as indicated in the first auxiliary information;

resuming transmission of first data or stopping blocking first data, where the first data includes data blocked in the first network and/or data not transmitted to the terminal as required in the first auxiliary information;

receiving a first service or stopping blocking a first service, where the first service includes a service blocked in the first network and/or a service not transmitted to the terminal as required in the first auxiliary information; or resuming first paging or stopping blocking first paging, where the first service includes a type of paging blocked in the first network and/or a type of paging not transmitted to the terminal as indicated in the first auxiliary information; and/or the operation related to validation of the first auxiliary information includes at least one of the following:

keeping the first auxiliary information valid;

keeping the operation performed on the connection between the terminal and the first network, the data channel related to the terminal, the data related to the terminal, the service related to the terminal, and/or the paging related to the terminal according to the first auxiliary information;

updating the first auxiliary information according to the updated first auxiliary information;

an operation performed on the connection between the terminal and the first network, the data channel related to the terminal, the data related to the terminal, the service related to the terminal, and/or the paging related to the terminal according to the updated first auxiliary information;

skipping resuming the data channel connection related to the terminal;

extending the invalidation time of the first auxiliary information.

Optionally, an operation related to invalidation of the first auxiliary information is performed in a case that a ninth condition is satisfied.

The ninth condition includes at least one of the following:

the terminal does not return to the first network before the validation time of the terminal expires or before the invalidation time starts;

the validation time expires; or the invalidation time arrives;

and/or performing an operation related to validation of the first auxiliary information in a case that a tenth condition is satisfied, where the tenth condition includes at least one of the following: the extended invalidation time of the first auxiliary information is received, the extended validation time of the first auxiliary information is received, it is before the validation time of the first auxiliary information expires, and it is before the invalidation time of the first auxiliary information starts.

The information processing apparatus in the embodiments of this application may be an apparatus or may be a component, an integrated circuit, or a chip in a terminal. The apparatus may be a mobile electronic device or may be a non-mobile electronic device. For example, the mobile electronic device may be a mobile phone, a tablet computer, a notebook computer, a palm computer, an in-vehicle electronic device, a wearable device, an ultra-mobile personal computer (UMPC), a netbook, or a personal digital assistant (PDA); and the non-mobile electronic device may be a server, a network attached storage (NAS), a personal computer (PC), a television (TV), a teller machine, or an automated machine, which are not specifically limited in the embodiments of this application.

The information processing apparatus in the embodiments of this application may be an apparatus with an operating system. The operating system may be an Android (Android) operating system, may be an iOS operating system, or may be another possible operating system, and is not specifically limited in the embodiments of this application.

The information processing apparatus provided in this embodiment of this application can implement various processes implemented by the information processing method in the method embodiment of FIG. 4. To avoid repetition, details are not described herein again.

In the information processing apparatus provided in this embodiment of this application, the first network receives the invalidation time of the first auxiliary information and/or the extended invalidation time of the first auxiliary information sent by the terminal, so that first auxiliary information can be invalidated or kept valid without returning to the first network or leaving the second network, thereby saving signaling and network resources.

Figure 11:
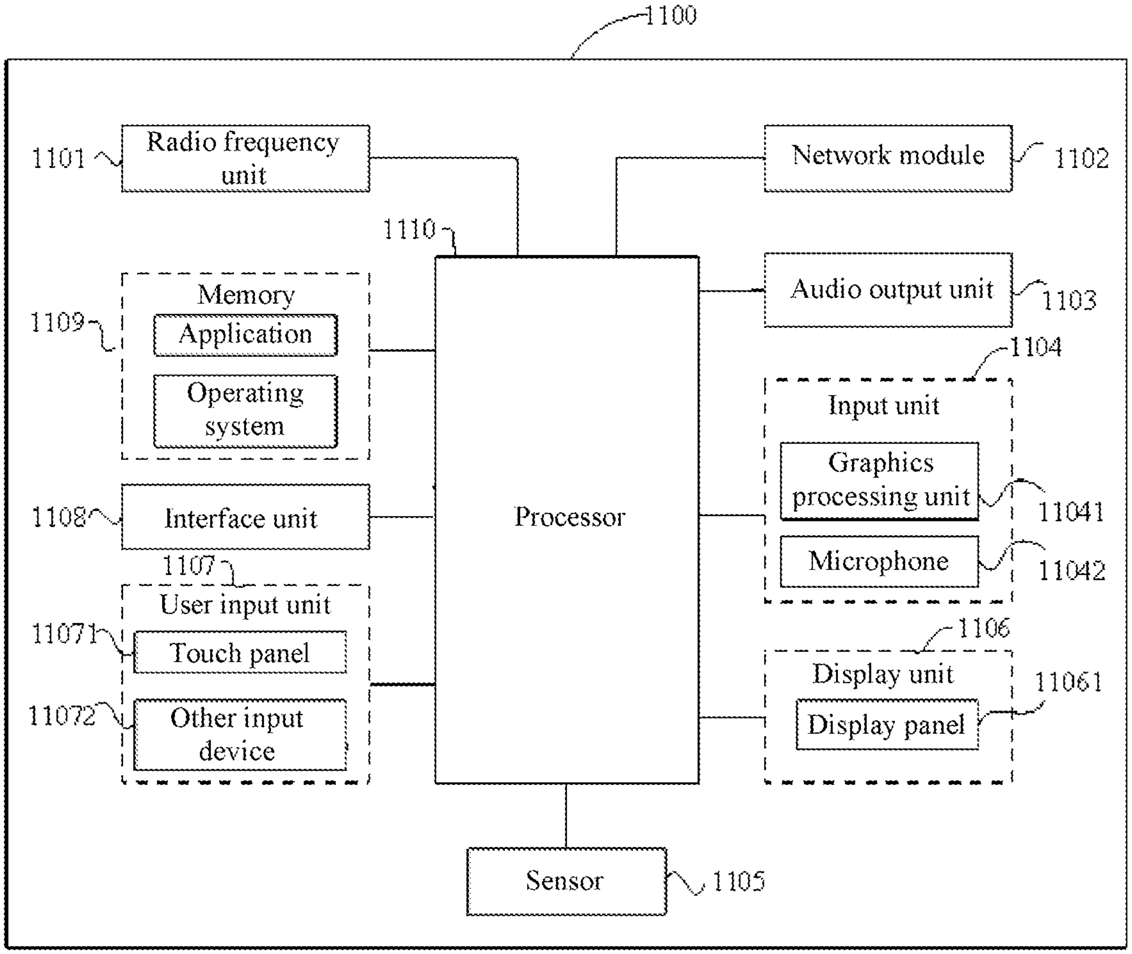
FIG. 11 is a schematic diagram of a hardware structure of a terminal implementing an embodiment of this application.

FIG. 11 is a schematic diagram of a hardware structure of a terminal implementing an embodiment of this application.

The terminal 1100 includes, but is not limited to, components such as a radio frequency unit 1101, a network module 1102, an audio output unit 1103, an input unit 1104, a sensor 1105, a display unit 1106, a user input unit 1107, an interface unit 1108, a memory 1109, and a processor 1110.

A person skilled in the art may understand that the terminal 1100 may further include a power supply (such as a battery) for supplying power to the components. The power supply may be logically connected to the processor 1110 by a power supply management system, thereby implementing functions, such as charging, discharging, and power consumption management, by using the power supply management system. A terminal structure shown in FIG. 11 does not constitute a limitation to the terminal, and the terminal may include more or fewer components than those shown in the figure, or some components may be combined, or a different component deployment may be used. Details are not described herein again.

It should be understood that, in the embodiments of this application, the input unit 1104 may include a graphics processing unit (GPU) 11041 and a microphone 11042. The graphics processing unit 11041 processes image data of a static picture or a video obtained by an image capturing apparatus (for example, a camera) in a video capturing mode or an image capturing mode. The display unit 1106 may include a display panel 11061, and the display panel 11061 may be configured in a form such as a liquid crystal display or an organic light-emitting diode. The user input unit 1107 includes a touch panel 11071 and another input device 11072. The touch panel 11071 is also referred to as a touchscreen. The touch panel 11071 may include two parts: a touch monitoring apparatus and a touch controller. The another input device 11072 may include, but not limited to, a physical keyboard, a functional key (such as a volume control key or a switch key), a track ball, a mouse, and a joystick, which is not described herein in detail.

In this embodiment of this application, after being received by the radio frequency unit 1101, downlink data from the network-side device is processed by the processor 1110. In addition, uplink data is sent to the network-side device. Generally, the radio frequency unit 1101 includes, but is not limited to, an antenna, at least one amplifier, a transceiver, a coupler, a low noise amplifier, a duplexer, and the like.

The memory 1109 may be configured to store a software program or instructions and various data. The memory 1109 may mainly include a program or instruction storage region and a data storage region. The program or instruction storage region may store an operating system, an application or instructions required by at least one function (for example, a sound playback function or an image display function), and the like. In addition, the memory 1109 may include a high-speed random access memory, or may include a non-volatile memory, where the non-volatile memory may be a read-only memory (ROM), a programmable read-only memory (PROM), an erasable programmable read-only memory (EPROM), an electrically erasable programmable read-only memory (EEPROM), or a flash memory, for example, at least one magnetic disk storage device, a flash memory device, or other volatile solid-state storage devices.

Optionally, the processor 1110 may include one or more processing units. Optionally, the processor 1110 may integrate an application processor and a modem. The application processor mainly processes an operating system, a user interface, an application or instructions, and the like. The modem processor mainly processes wireless communication, for example, a baseband processor. It may be understood that the modulation and demodulation processor may not be integrated into the processor 1110.

The radio frequency unit 1101 is configured to send first information to a first network, where the first information includes at least one of the following: a connection establishment request, a connection resuming request, or first return information.

The terminal provided in the embodiments of this application sends the first information to the first network, to process, when the terminal returns to the network, the first auxiliary information and/or indicate an operation performed by the first network based on the first auxiliary information, which can save signaling and network resources.

Optionally, the radio frequency unit 1101 is further configured to send the first return information in a case that a first condition is satisfied.

The first condition includes at least one of the following:

a terminal leaves a second network or a terminal leaves a second network for a short period;

a terminal returns to the first network or a terminal returns to the first network for a short period;

a terminal has left the first network; or a terminal has provided first auxiliary information to the first network.

Optionally, the first return information includes at least one of the following:

first indication information used for indicating that the first auxiliary information is invalid;

second indication information used for indicating that the first auxiliary information is valid;

a return time or a planned leave time;

third indication information used for indicating a short-period return or a planned leave;

fourth indication information used for indicating a long-period return;

information used for blocking a downlink service and/or downlink data;

request information for a data channel; or updated first auxiliary information, where the request information for the data channel includes at least one of the following: indication information for requesting for skipping resuming the data channel; indication information for requesting for resuming the data channel connection, information about the data channel of which activation is requested, or information about the data channel of which inactivation is requested.

Optionally, the second indication information includes at least one of the following:

an indication for refusing to resume and/or establish a connection between the terminal and a network;

an indication for refusing to resume and/or activate signaling and/or data transmission between the terminal and a network;

an indication for refusing to accept paging; or a busy indication.

Optionally, the radio frequency unit 1101 is further configured to receive type information of a service and/or data sent by the first network.

The processor 1110 is further configured to perform at least one of the following according to the type information of the service and/or the data:

re-determining a return type of a return to the first network, where the return type includes a long-period return or a short-period return;

re-determining to return to or leave from the first network;

re-determining whether the first auxiliary information is valid;

re-determining a leave type of a leave from the second network, where the leave type includes a long-period leave or a short-period leave;

determining whether to extend or delay a return time or a planned leave time;

determining whether to request the first network to activate a data channel corresponding to the service and/or the data;

determining whether to request the first network to block the service and/or the data;

determining whether to request the first network to suspend a data channel corresponding to the service and/or the data;

determining whether to update the first auxiliary information;

determining whether to release or suspend a connection with the second network locally;

determining whether to set a state of a connection with the second network to a non-connected state;

sending return confirmation information to the first network; or sending leave confirmation information to the second network, where the return confirmation information includes at least one of the following: return confirmation type information, the return time or the planned leave time, confirmation information of first auxiliary information, request information for a data channel, or updated first auxiliary information;

the return confirmation type information includes one of the following: fifth indication information used for indicating a short-period return or used for indicating a leave or sixth indication information used for indicating a long-period return or used for indicating a return;

the confirmation information of the first auxiliary information includes one of following: seventh indication information used for indicating that the first auxiliary information is valid or eighth indication information used for indicating that the first auxiliary information is invalid; and the leave confirmation information includes one of the following: first leave indication information used for indicating a short-period leave or second leave indication information used for indicating a long-period leave.

Optionally, after the sending first information to a first network, or after the sending return confirmation information to the first network, the radio frequency unit 1101 is further configured to receive second confirmation information. The second confirmation information includes: indication information for confirming that the first auxiliary information is invalid or indication information for confirming that the first auxiliary information is valid.

Optionally, the processor 1110 is further configured to perform a first operation in a case that a second condition is satisfied, where the first operation includes at least one of the following:

sending at least one of the following to the first network: the sixth indication information used for indicating a long-period return or used for indicating a return, the eighth indication information used for indicating that the first auxiliary information is invalid, or the request information for the data channel;

sending the second leave indication information to the second network;

releasing or suspending the connection with the second network locally;

setting the state of the connection with the second network to the non-connected state, where the second condition includes at least one of the following:

it is re-determined that the return type of the return to the first network is the long-period return;

it is re-determined that the leave type of the leave from the second network is the long-period leave; or it is re-determined that the first auxiliary information is invalid;

and/or performing a second operation in a case that a third condition is satisfied, where the second operation includes at least one of the following:

sending at least one of the following to the first network: the fifth indication information used for indicating a short-period return or used for indicating a leave, the seventh indication information used for indicating that the first auxiliary information is valid, the return time or the planned leave time, the request information for the data channel, or the updated first auxiliary information;

sending the first leave indication information to the second network; or performing at least one of the following when the fifth indication information is used for indicating that the leave or return time arrives, the planned leave time arrives, and/or an objective of the short-period return to the first network is achieved: sending a leave request and/or the updated first auxiliary information to the first network; releasing or suspending the connection with the first network locally; setting the state of the connection with the first network to the non-connected state; sending, to the second network, indication information indicating a return; or establishing or resuming the connection with the second network locally, where the third condition includes at least one of the following:

it is re-determined that the return type of the return to the first network is the short-period return;

it is re-determined that the leave type of the leave from the second network is the short-period leave; or it is re-determined that the first auxiliary information is valid.

Optionally, in a case that the first return information is empty, or the first information does not include the first return information, it indicates a long-period return.

Optionally, the processor 1110 is further configured to perform at least one of the following when fifth indication information is used for indicating that a leave or return time arrives, a planned leave time arrives, and/or an objective of a short-period return to the first network is achieved:

sending a leave request and/or updated first auxiliary information to the first network;

releasing or suspending a connection between a terminal and the first network locally;

setting a state of a connection between a terminal and the first network to a non-connected state;

sending, to a second network, indication information indicating a return; or establishing or resuming a connection between a terminal and a second network locally, where the return time is a return time in the first return information or return confirmation information; and the leave time is a planned leave time in the first return information or the return confirmation information.

The terminal provided in the embodiments of this application sends the first information to the first network, to process, when the terminal returns to the network, the first auxiliary information and/or indicate an operation performed by the first network based on the first auxiliary information, which can save signaling and network resources.

The embodiments of this application further provide a terminal. A radio frequency unit 1101 is configured to send an invalidation time of first auxiliary information and/or an extended invalidation time of first auxiliary information to a first network.

Optionally, the invalidation time of the first auxiliary information is used for the first network to perform an operation related to invalidation of the first auxiliary information based on the invalidation time.

The terminal provided in this embodiment of this application can invalidate, by sending the invalidation time of the first auxiliary information and/or the extended invalidation time of the first auxiliary information to the first network, the first auxiliary information without returning to the first network or leaving the second network, thereby saving signaling and network resources.

Figure 12:
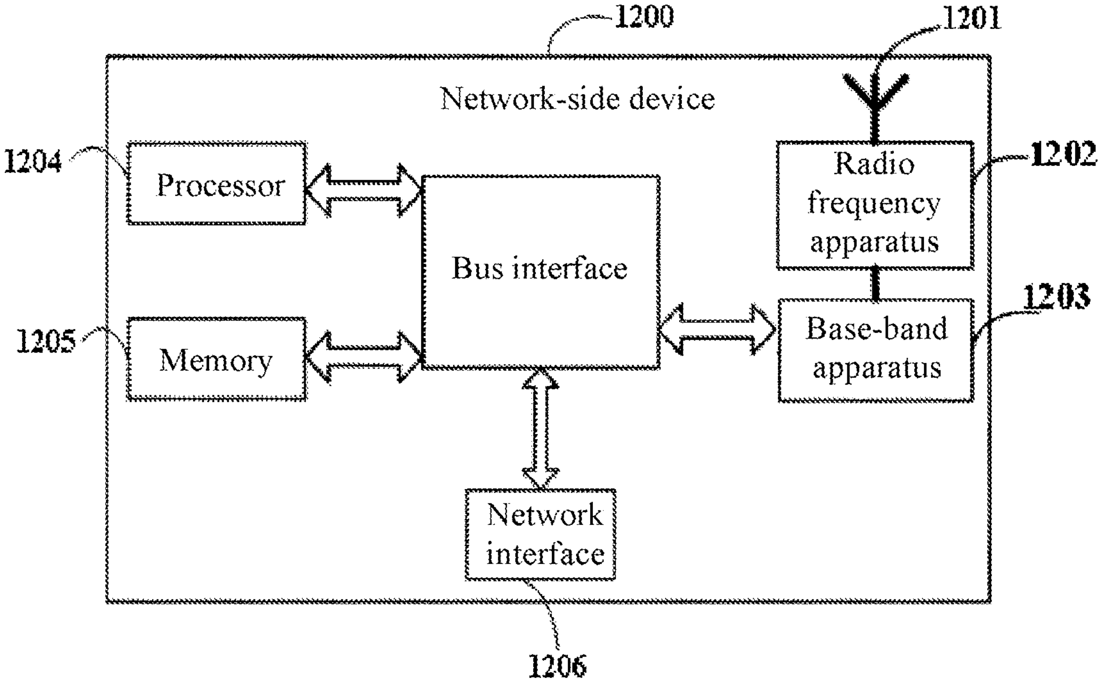
FIG. 12 is a schematic structural diagram of a network-side device according to an embodiment of this application.

The embodiments of this application further provide a network-side device. As shown in FIG. 12, the network-side device 1200 includes: an antenna 1201, a radio frequency apparatus 1202, and a baseband apparatus 1203. The antenna 1201 is connected to the radio frequency apparatus 1202. In an uplink direction, the radio frequency apparatus 1202 receives, by using the antenna 1201, information, and sends the received information to the baseband apparatus 1203 for processing. In a downlink direction, the baseband apparatus 1203 processes to-be-sent information, and sends the information to the radio frequency apparatus 1202. The radio frequency apparatus 1202 processes the received information and then sends the information by using the antenna 1201.

The foregoing frequency band processing apparatus may be located in the baseband apparatus 1203. The method performed by the network-side device in the foregoing embodiments can be implemented in the baseband apparatus 1203. The baseband apparatus 1203 includes a processor 1204 and a memory 1205.

The baseband apparatus 1203 may include, for example, at least one baseband plate. A plurality of chips are arranged on the baseband plate. As shown in FIG. 12, one of the plurality of chips is, for example, the processor 1204, and is connected to the memory 1205, to invoke a program in the memory 1205 to perform operations of the network-side device in the foregoing method embodiments.

The baseband apparatus 1203 may further include an interface 1206, configured to exchange information with the radio frequency apparatus 1202. The interface is, for example, a common public radio interface (CPRI for short).

Alternatively, the network-side device provided in the embodiments of the present disclosure further includes: instructions or program stored in the memory 1205 and executable on the processor 1204. The processor 1204 calls the instructions or program in the memory 1205 to execute the method performed by the modules shown in FIG. 8 or FIG. 10 and produce the same technical effects. To avoid repetition, details are not described herein again.

The network-side device provided in the embodiments of this application sends the first information to the first network, to process, when the terminal returns to the network, the first auxiliary information and/or indicate an operation performed by the first network based on the first auxiliary information, which can save signaling and network resources.

The embodiments of this application further provide a readable storage medium. The readable storage medium stores a program or instructions. The program or instructions, when executed by a processor, implement the processes of the foregoing embodiments of the information processing method and can achieve the same technical effects. To avoid repetition, details are not described herein again.

The processor is a processor in the electronic device in the foregoing embodiments. The readable storage medium includes a computer-readable storage medium such as a computer read-only memory (ROM), a random access memory (RAM), a magnetic disk, or an optical disc.

The embodiments of this application further provide a chip, including a processor and a communication interface. The communication interface is coupled to the processor, and the processor is configured to execute a program or instructions, to implement processes of the embodiments of the foregoing information processing method, and can achieve the same technical effects. To avoid repetition, details are not described herein again.

It should be noted that, the chip mentioned in the embodiments of this application may also be referred to as a system-level chip, a system chip, a chip system, a system on chip, or the like.

It should be noted that terms "include", "comprise", and any variants thereof are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or device. Without more limitations, elements defined by a sentence "including one" does not exclude that there are still other same elements in the process, method, object, or apparatus. Besides, it should be noted that ranges of the method and apparatus in the implementations of this application are not limited to implementing functions in an order shown or discussed, but may include implementing functions according to the included functions in a substantially simultaneous manner or in a reverse order, for example, the described method may be performed in an order different than the described order. In addition, various steps may also be added, omitted, or combined. In addition, features described with reference to some examples may also be combined in other examples.

Through the descriptions of the foregoing implementations, a person skilled in the art may clearly understand that the method according to the foregoing embodiments may be implemented through software and a necessary general hardware platform, and certainly, may also be implemented by hardware, but in many cases, the former manner is a better implementation. Based on such an understanding, the technical solutions of this application essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of this application.

Although the embodiments of this application have been described above with reference to the accompanying drawings, this application is not limited to the specific embodiments described above, and the specific embodiments described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. An information processing method performed by a network-side device, comprising:

receiving first auxiliary information and second indication information;

receiving first indication information used for indicating that the first auxiliary information is invalid; and performing a third operation based on the first indication information, wherein the third operation comprises deleting the first auxiliary information; and the first auxiliary information is information that is provided by a terminal to the network-side device and that is used to block the paging related to the terminal; wherein the network-side device comprises access mobility management function (AMF);

the second indication information comprises at least one of the following:

an indication for refusing to resume and/or establish a connection between the terminal and the network-side device;

an indication for refusing to resume and/or activate signaling and/or data transmission between the terminal and the network-side device;

an indication for refusing to accept paging; or a busy indication.

2. The information processing method according to claim 1, wherein the third operation further comprises at least one of the following:

an operation related to invalidation of the first auxiliary information; or sending second confirmation information; wherein the second confirmation information comprises indication information used for confirming that the first auxiliary information is invalid.

3. The information processing method according to claim 2, wherein the operation related to invalidation of the first auxiliary information comprises at least one of the following:

resuming a data channel connection related to the terminal;

resuming a first data channel or canceling an operation of suspending a first data channel, wherein the first data channel comprises a data channel suspended as indicated in the first auxiliary information;

resuming transmission of first data or stopping blocking first data, wherein the first data comprises data blocked in the first network and/or data not transmitted to the terminal as required in the first auxiliary information;

receiving a first service or stopping blocking a first service, wherein the first service comprises a service blocked in the first network and/or a service not transmitted to the terminal as required in the first auxiliary information; or resuming first paging or stopping blocking first paging, wherein the first service comprises a type of paging blocked in the first network and/or a type of paging not transmitted to the terminal as indicated in the first auxiliary information.

4. The information processing method according to claim 2, wherein the second confirmation information further comprises: indication information for confirming that the first auxiliary information is valid.

5. The information processing method according to claim 1, wherein the third operation further comprises:

sending type information of a service and/or data related to a terminal to the terminal; wherein the type information of a service and/or data related to the terminal comprises at least one of the following: a service and/or data not blocked by the first auxiliary information, a service and/or data related to the terminal and cached, a service related to the terminal and initiated by a first network, or data related to the terminal and generated or received by the first network; and reconfirming, by the terminal, according to the type information of the service and/or the data, related content of first return information; and reconfirming a short-period return to, a leave from, or a long-period return to the first network.

6. The information processing method according to claim 5, wherein after the step of sending type information of a service and/or data related to a terminal to the terminal, the method further comprises:

receiving return confirmation information sent by the terminal; and performing the third operation according to the return confirmation information, wherein the return confirmation information comprises at least one of the following: return confirmation type information, the return time, confirmation information of first auxiliary information, request information for a data channel, or updated first auxiliary information;

the return confirmation type information comprises one of the following: fifth indication information used for indicating a short-period return or sixth indication information used for indicating a long-period return or used for indicating a return;

the confirmation information of the first auxiliary information comprises: eighth indication information used for indicating that the first auxiliary information is invalid; and the request information for the data channel comprises at least one of the following:

indication information for requesting for resuming the data channel connection, or information about the data channel of which activation is requested.

7. The information processing method according to claim 1, wherein the performing the third operation comprises:

performing an operation related to invalidation of the first auxiliary information in a case that a fourth condition is satisfied, wherein the fourth condition comprises at least one of the following:

a connection establishment request or a connection resuming request for the first network is received from the terminal;

the terminal and the first network establish a connection and/or resume a connection;

first return information is empty or the first return information is not received;

the first return information comprises at least one of the following: first indication information used for indicating invalidation of the first auxiliary information, fourth indication information used for indicating a long-period return, or request information used for resuming a data connection channel; or the return confirmation information comprises at least one of the following: sixth indication information used for indicating a long-period return or used for indicating a return and eighth indication information used for indicating that the first auxiliary information is invalid.

8. The information processing method according to claim 1, wherein the first auxiliary information comprises at least one of the following:

blocking all downlink services and/or data;

information about a blocked data channel;

information about a blocked service; or a blocked paging reason; and the first indication information is sent through a registration request message of a non-access stratum (NAS) layer.

9. The information processing method according to claim 1, wherein the performing the third operation comprises:

in a case that a fourth condition is met, performing the third operation, wherein the fourth condition comprises that:

a registration request or a service request between the terminal and a first network is received; and a connection between the terminal and the first network is established and/or resumed.

10. A network-side device, comprising:

a processor; and a memory storing a program or instruction that is executable on the processor, wherein the program or the instruction, when executed by the processor, causes the network-side device to perform:

receiving first auxiliary information and second indication information;

receiving first indication information used for indicating that the first auxiliary information is invalid; and performing a third operation based on the first indication information, wherein the third operation comprises deleting the first auxiliary information; and the first auxiliary information is information that is provided by a terminal to the network-side device and that is used to block the paging related to the terminal; wherein the network-side device comprises access mobility management function (AMF);

the second indication information comprises at least one of the following:

an indication for refusing to resume and/or establish a connection between the terminal and the network-side device;

an indication for refusing to resume and/or activate signaling and/or data transmission between the terminal and the network-side device;

an indication for refusing to accept paging; or a busy indication.

11. The network-side device according to claim 10, wherein the first auxiliary information comprises at least one of the following:

blocking all downlink services and/or data;

information about a blocked data channel;

information about a blocked service; or a blocked paging reason; and the first indication information is sent through a registration request message of a non-access stratum (NAS) layer.

12. The network-side device according to claim 10, wherein the performing the third operation comprises:

in a case that a fourth condition is met, performing the third operation, wherein the fourth condition comprises that:

a registration request or a service request between the terminal and a first network is received; and a connection between the terminal and the first network is established and/or resumed.

13. A non-transitory readable storage medium storing a program or instruction, wherein the program or instruction, when executed by a processor of a network-side device, causes the network-side device to perform:

receiving first auxiliary information and second indication information;

receiving first indication information used for indicating that the first auxiliary information is invalid; and performing a third operation based on the first indication information, wherein the third operation comprises deleting the first auxiliary information; and the first auxiliary information is information that is provided by a terminal to the network-side device network and that is used to block the paging related to the terminal; wherein the network-side device comprises access mobility management function (AMF);

the second indication information comprises at least one of the following:

an indication for refusing to resume and/or establish a connection between the terminal and the network-side device;

an indication for refusing to resume and/or activate signaling and/or data transmission between the terminal and the network-side device;

an indication for refusing to accept paging; or a busy indication.

14. The non-transitory readable storage medium according to claim 13, wherein the first auxiliary information comprises at least one of the following:

blocking all downlink services and/or data;

information about a blocked data channel;

information about a blocked service; or a blocked paging reason; and the first indication information is sent through a registration request message of a non-access stratum (NAS) layer.

15. The non-transitory readable storage medium according to claim 13, wherein the performing the third operation comprises:

in a case that a fourth condition is met, performing the third operation, wherein the fourth condition comprises that:

a registration request or a service request between the terminal and a first network is received; and a connection between the terminal and the first network is established and/or resumed.

* * * * *